(12) United States Patent
Chang et al.

(10) Patent No.: US 9,636,779 B2
(45) Date of Patent: May 2, 2017

(54) CONNECTION STRUCTURE APPLIED TO A FAN FOR CONNECTING A METAL MEMBER WITH A SHAFT BY MEANS OF LASER

(71) Applicant: ASIA VITAL COMPONENTS CO., LTD., Sinjhuang District, New Taipei (TW)

(72) Inventors: Bor-Haw Chang, New Taipei (TW); Ping-Tsang Ho, New Taipei (TW); Hao-Ying Chen, New Taipei (TW); Yen-Shi Chen, New Taipei (TW); Yen-Chin Lu, New Taipei (TW); Chun-Hao Huang, New Taipei (TW)

(73) Assignee: Asia VItal Components Co., Ltd., New Taipei (TW)

(*) Notice: Subject to any disclaimer, the term of this patent is extended or adjusted under 35 U.S.C. 154(b) by 905 days.

(21) Appl. No.: 13/903,996

(22) Filed: May 28, 2013

(65) Prior Publication Data

US 2014/0356054 A1     Dec. 4, 2014

(51) Int. Cl.
*F04D 29/20* (2006.01)
*F04D 29/044* (2006.01)
(Continued)

(52) U.S. Cl.
CPC ............ *B23K 26/206* (2013.01); *B23K 26/28* (2013.01); *F04D 25/0613* (2013.01);
(Continued)

(58) Field of Classification Search
CPC .. F04D 25/064; F04D 29/0405; F04D 29/043; F04D 29/044; F04D 29/053; F04D 29/054; F04D 29/20
See application file for complete search history.

(56) References Cited

U.S. PATENT DOCUMENTS 4,040,769 A *   8/1977   Britz ................... F04D 29/325
                                              416/213 A
6,023,117 A *   2/2000   Chen .................. F04D 25/0613
                                              310/68 R
(Continued)

FOREIGN PATENT DOCUMENTS

CN       101776084 A      7/2010
CN       102384096 A      3/2012
(Continued)

*Primary Examiner* — Michael P Ferguson
(74) *Attorney, Agent, or Firm* — C. G. Mersereau; Nikolai & Mersereau, P.A.

(57) ABSTRACT

A connection structure applied to a fan for connecting a metal member with a shaft by means of laser. The connection structure includes a metal member and a shaft. The metal member has an opening, a first side and a second side. The opening is formed through a center of the metal member. The shaft is inserted in the opening. An outer circumference of the shaft is welded with a circumference of the opening on the first side to form at least one first welding section between the contact sections of the outer circumference of the shaft and the circumference of the opening on the first side. The first welding section is connected between the outer circumference of the shaft and the circumference of the opening on the first side to integrally connect the metal member with the shaft. The connection structure applied to the fan can lower cost.

3 Claims, 27 Drawing Sheets

(51) Int. Cl.
*B23K 26/20* (2014.01)
*B23K 26/28* (2014.01)
*F04D 25/06* (2006.01)
*F04D 29/02* (2006.01)
*F04D 29/26* (2006.01)
*F04D 29/32* (2006.01)

(52) U.S. Cl.
CPC ......... *F04D 29/023* (2013.01); *F04D 29/263* (2013.01); *F04D 29/329* (2013.01); *F05D 2230/234* (2013.01); *F05D 2300/10* (2013.01); *F05D 2300/43* (2013.01); *Y10T 403/478* (2015.01)

(56) References Cited

U.S. PATENT DOCUMENTS

| | | | | |
|---|---|---|---|---|
| 6,700,256 | B2* | 3/2004 | Fukutani | G11B 19/2009 310/67 R |
| 8,147,203 | B2* | 4/2012 | Chen | F04D 29/263 415/213.1 |
| 2012/0177515 | A1* | 7/2012 | Schmid | F04D 29/662 417/423.14 |
| 2012/0201682 | A1* | 8/2012 | Dymond | F04D 29/02 416/204 R |

FOREIGN PATENT DOCUMENTS

| | | |
|---|---|---|
| JP | 2009250158 A | 10/2009 |
| TW | I279036 B | 4/2007 |
| TW | I322228 B | 2/2010 |
| TW | 201211394 A | 3/2012 |
| TW | I381613 B | 1/2013 |

\* cited by examiner

CONNECTION STRUCTURE APPLIED TO A FAN FOR CONNECTING A METAL MEMBER WITH A SHAFT BY MEANS OF LASER

BACKGROUND OF THE INVENTION

1. Field of the Invention

The present invention relates generally to a connection structure, and more particularly to a connection structure applied to a fan for connecting a metal member with a shaft by means of laser. The connection structure is applied to a fan with small torque or great torque to lower cost and enhance counterbalance of the fan and prevent the shaft from loosening.

2. Description of the Related Art

It is known that when a high-performance electronic apparatus works, a great amount of heat will be generated along with the operation of the electronic components inside the electronic apparatus. In general, a heat sink or a radiating fin assembly is disposed on the electronic components to enlarge the heat dissipation area and enhance the heat dissipation effect. The heat sink and the radiating fin assembly dissipate the heat simply by way of radiation so that the heat dissipation effect achieved by the heat sink and the radiating fin assembly is limited. Therefore, it is often necessary to additionally dispose a cooling fan to dissipate the heat of the heat sink or the radiating fin assembly and enhance the heat dissipation effect. Accordingly, the cooling fan has become a very important component in a thermal module.

In the conventional cooling fan, the fan impeller 10 and the shaft 12 are generally connected in two manners as follows:

1. As shown in FIG. 1A, the shaft 12 is integrally enclosed in the fan impeller 10 by means of injection molding. The shaft 12 is placed into a preset mold and then the fan impeller 10 is formed by means of plastic injection molding to integrally enclose the shaft 12. In the above structure, the plastic material has insufficient thermal deformation resistance and poor structural strength so that the fan impeller is subject to affection of high temperature or collision. As a result, the shaft is likely to deflect and the fan impeller is apt to deform. In addition, the shaft 12 is a cylindrical member, which is integrally enclosed in the fan impeller 10 by means of injection molding. Therefore, in the case that the structure is applied to a cooling fan 1 with great torque, the rotational torque of the fan impeller 10 will be greater than the connection torque between the shaft 12 and the fan impeller 10. Under such circumstance, the shaft 12 is very likely to loosen or even detached from the fan impeller 10 to cause damage and failure of the cooling fan 1.

2. As shown in FIG. 1B, the shaft 12 is fitted into a hole 131 of a copper sleeve 13 by means of pressing. Then the copper sleeve 13 with the shaft 12 is fitted into a fitting hole 141 of an iron casing 14 by means of pressing to form a hub 15. Multiple blades 16 are formed on an outer circumference of the hub 15 by means of plastic injection molding. The blades 16 are integrally connected with the hub 15 to form the fan impeller 10. The structure formed by means of pressing can improve the problems of deflection of the shaft and the deformation of the fan impeller due to high temperature. However, there is another problem existing in such structure. That is, the iron casing 14 is formed by means of a continuous molding process so that the total cost is relatively high. Therefore, the material cost for the hub 15 composed of the iron casing 14, the copper sleeve 13 and the shaft 12 by means of pressing is increased. Moreover, the shaft 12 is connected with the copper sleeve 13 by pressing and the copper sleeve 13 with the shaft 12 is connected with the iron casing 14 also by means of pressing. In this case, it is hard to control the concentricity of the shaft 12 and the copper sleeve 13. Also, it is hard to control the concentricity of the copper sleeve 13 and the iron casing 14. As a result, the counterbalance of the fan impeller 10 is poor. Furthermore, the copper sleeve 13 must have a considerable thickness for fixing the shaft 12. The thick copper sleeve 13 will occupy a considerably large internal space of the hub 15 of the fan impeller 10. Therefore, the internal use space of the fan impeller 15 is reduced.

According to the above, the conventional cooling fan has the following shortcomings:

1. The fan impeller made by means of injection molding has poor thermal deformation resistance and poor structural strength so that the shaft is likely to deflect and the fan impeller is apt to deform. Therefore, the structure can be hardly applied to a cooling fan with great torque.
2. The total cost for the fan impeller made by means of pressing is relatively high and it is hard to control the concentricity.
3. The counterbalance of the fan impeller is poor.
4. The internal use space of the fan impeller is reduced.

SUMMARY OF THE INVENTION

It is therefore a primary object of the present invention to provide a connection structure applied to a fan for connecting a metal member with a shaft by means of laser. The connection structure is applied to a fan to lower cost and enhance connection strength between the shaft and the fan impeller.

It is a further object of the present invention to provide the above connection structure applied to a fan for connecting a metal member with a shaft by means of laser, which can prevent the fan impeller from deforming and enlarge the internal use space of the fan impeller.

It is still a further object of the present invention to provide the above connection structure applied to a fan for connecting a metal member with a shaft by means of laser, which is applicable to a fan with small torque or great torque.

To achieve the above and other objects, the connection structure of the present invention includes a metal member and a shaft. The metal member has an opening, a first side and a second side opposite to the first side. The opening is formed through a center of the metal member. The shaft is inserted in the opening. An outer circumference of the shaft is welded with a circumference of the opening on the first side to form at least one first welding section between contact sections of the outer circumference of the shaft and the circumference of the opening on the first side. The first welding section is connected between the outer circumference of the shaft and the circumference of the opening on the first side to integrally connect the metal member with the shaft. The connection structure is applicable to a fan with great torque or small torque to lower cost and enhance the connection strength between the shaft and the fan impeller. Moreover, the connection structure is applicable to a fan to enlarge the internal use space of the fan impeller and prevent the fan impeller from deforming.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1A:
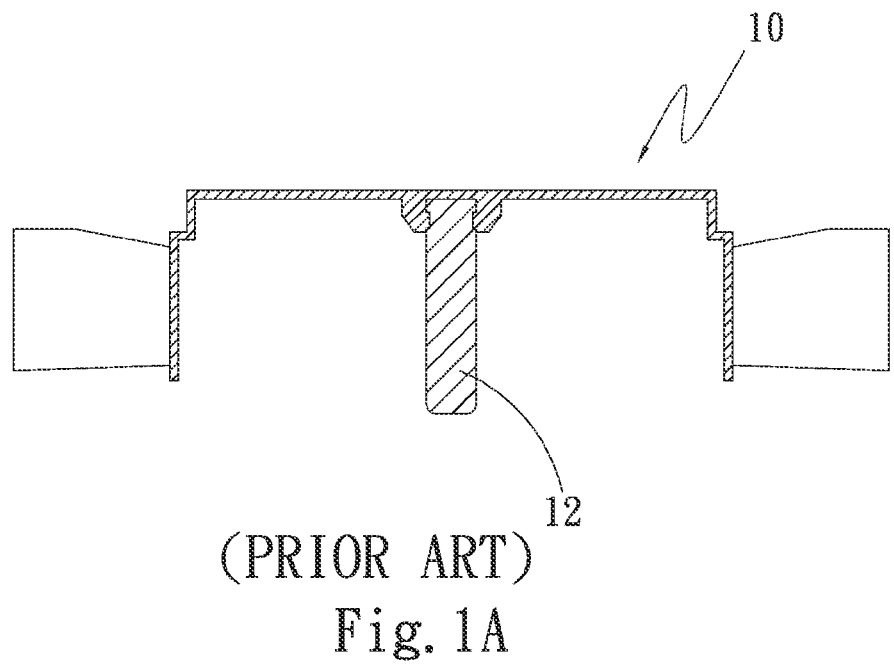
FIG. 1A is a sectional view of a conventional fan impeller.
Figure 1B:
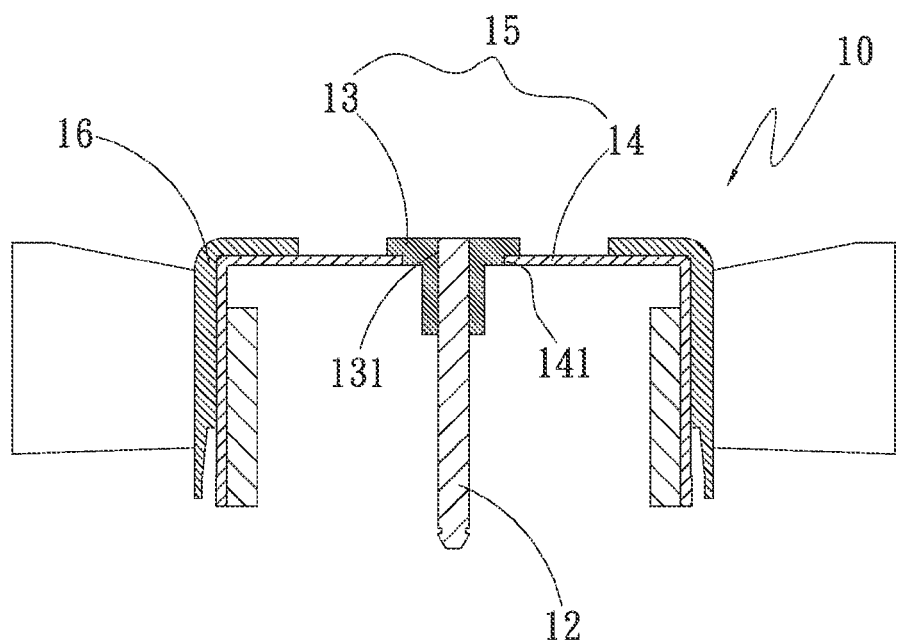
FIG. 1B is a sectional view of another conventional fan impeller.
Figure 2:
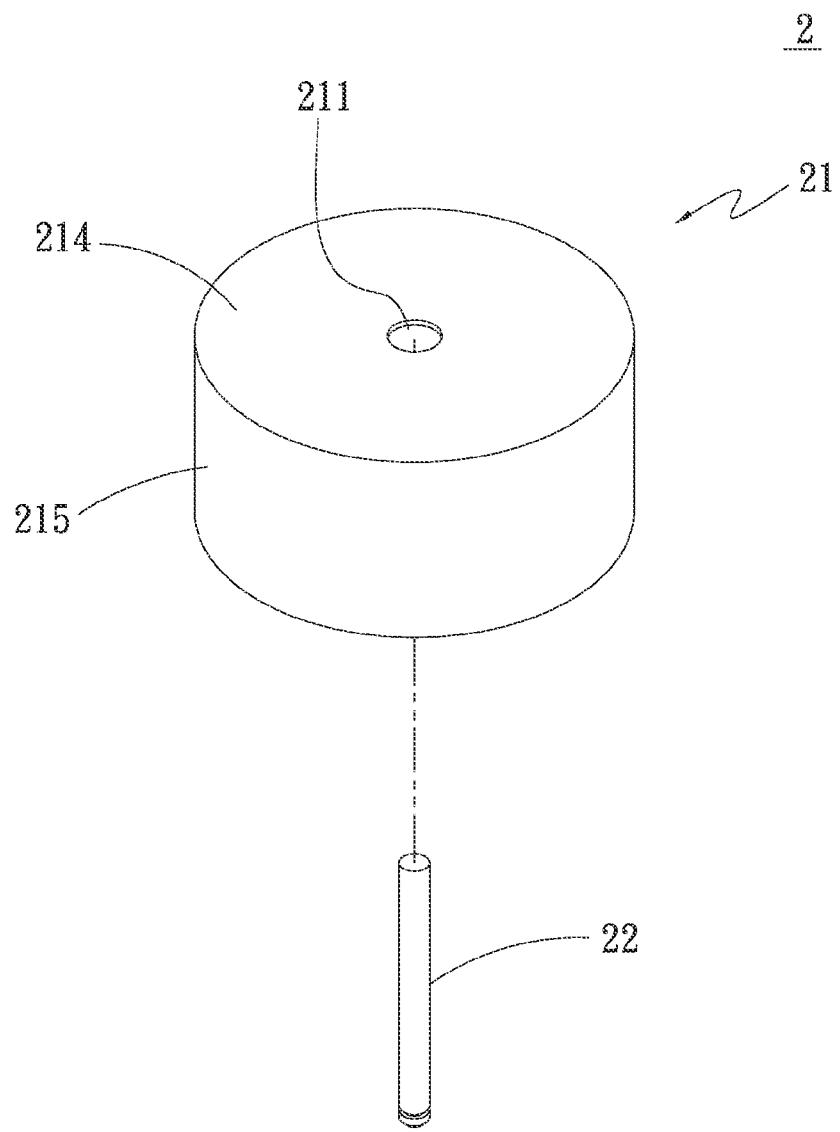
FIG. 2 is a perspective exploded view of a first embodiment of the present invention.
Figure 3A:
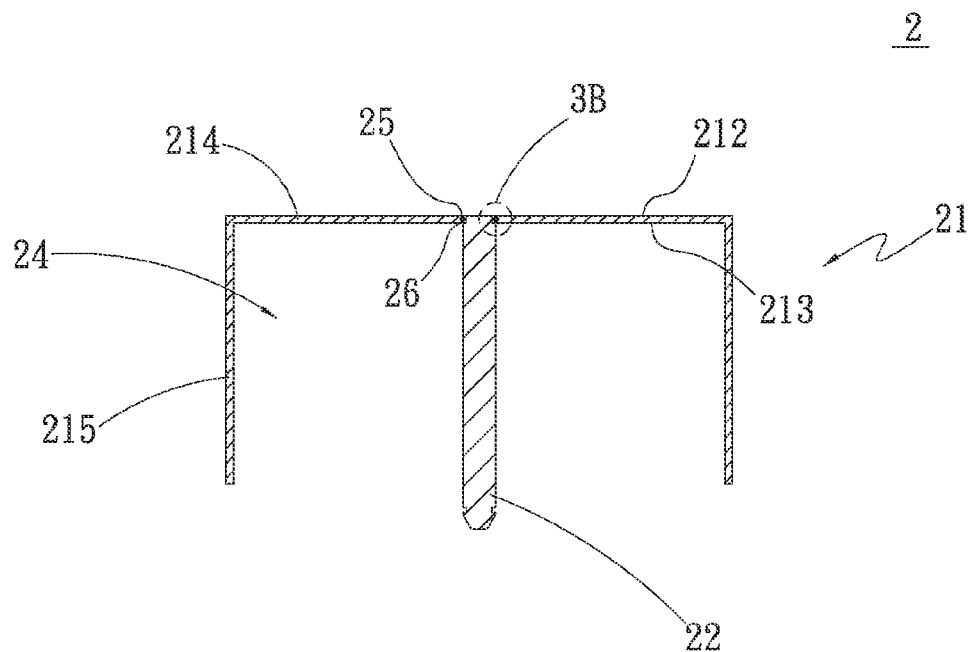
FIG. 3A is a sectional assembled view of the first embodiment of the present invention.
Figure 3B:
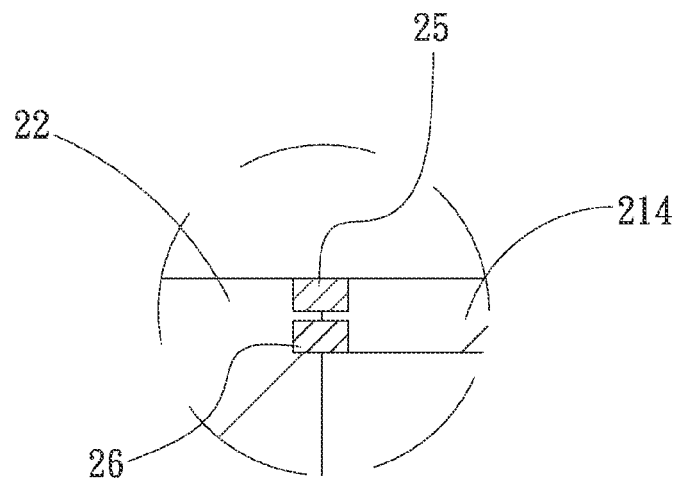
FIG. 3B is an enlarged view of circled area of FIG. 3A.

Please refer to FIGS. 2, 3A and 3B. FIG. 2 is a perspective exploded view of a first embodiment of the present invention. FIG. 3A is a sectional assembled view of the first embodiment of the present invention. FIG. 3B is an enlarged view of circled area of FIG. 3A. According to the first embodiment, the connection structure 2 of the present invention includes a metal member and a shaft 22. The metal member has an opening 211, a first side 212 and a second side 213 opposite to the first side 212. The opening 211 is formed through a center of the metal member. The metal member can be a metal hub 21 made of metal material (such as iron, copper or aluminum alloy). In this embodiment, the metal hub 21 is made of, but not limited to, iron for illustration purposes only. The metal hub 21, (that is, the metal member) has a top section 214 and a skirt section 215. The first side 212 is formed on an outer side of the top section 214, while the second side 213 is formed on an inner side of the top section 214. The skirt section 215 axially downward extends from a periphery of the top section 214 to together with the top section 214 define a receiving space 24 in communication with the opening 211.

The shaft 22 is inserted in the opening 211. In this embodiment, one end of the shaft 22 is inserted in the opening 211. An end face of the end of the shaft 22 is flush with the first side 212 of the top section 214. The other section of the shaft 22 is received in the receiving space 24. Alternatively, in practice, the length of the shaft 22 in the opening 211 and the receiving space 24 can be adjusted according to the use space and application requirements. For example, the end of the shaft 22 can protrude from the opening 211 to outer side of the top section 214.

In addition, an outer circumference of the shaft 22 (the outer circumference of the end of the shaft 22) is welded with a circumference of the opening 211 on the first side 212 of the top section 214 by means of laser processing (such as laser welding) to form at least one first welding section 25 between the contact sections of the outer circumference of the shaft 22 and the circumference of the opening 211 on the first side 212. That is, the first welding section 25 is connected between the outer circumference of the shaft 22 and the circumference of the opening 211 on the first side 212. The outer circumference of the shaft 22 (the outer circumference of the end of the shaft 22) is also welded with a circumference of the opening 211 on the second side 213 of the metal hub 21 (the metal member) by means of laser processing (such as laser welding) to form at least one second welding section 26 between the contact sections of the outer circumference of the shaft 22 and the circumference of the opening 211 on the second side 213. That is, the second welding section 26 is connected between the outer circumference of the shaft 22 and the circumference of the opening 211 on the second side 213. Via the first and second welding sections 25, 26, the metal hub 21 (the metal member) is integrally connected with the shaft 22 by means of laser welding to effectively enhance the structural strength and connection strength between the metal hub 21 and the shaft 22 and prevent the shaft 22 from loosening from the metal hub 21. The laser processing can be single-point or multipoint laser beam.

Figure 4A:
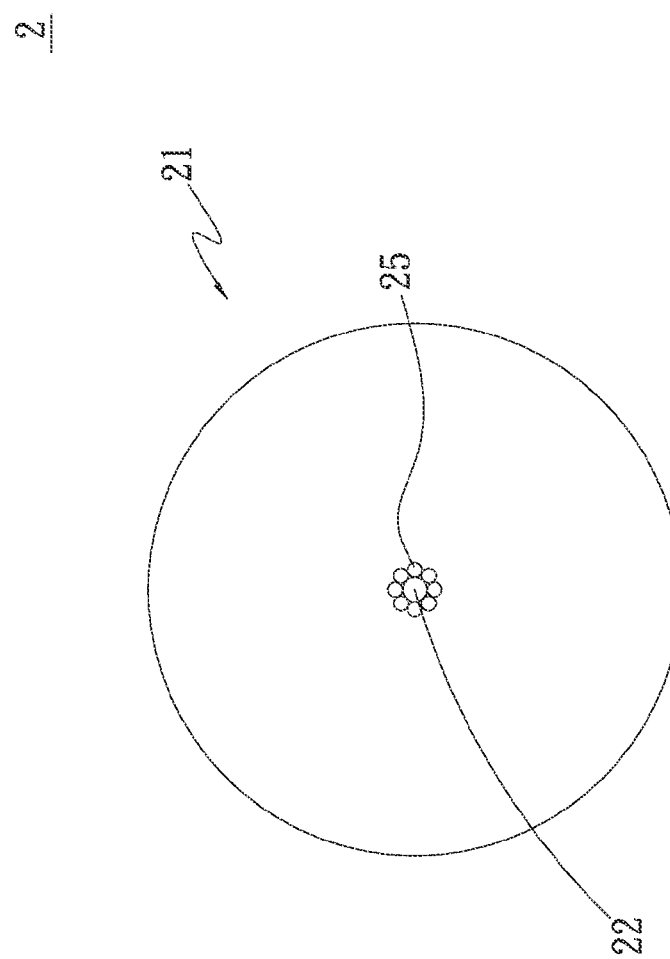
FIG. 4A is a top view of a first aspect of the first embodiment of the present invention.

Please further refer to FIGS. 3A and 3B. The first welding section 25 is connected between the outer circumference of the shaft 22 and the circumference of the opening 211 on the first side 212 and the second welding section 26 is connected between the outer circumference of the shaft 22 and the circumference of the opening 211 on the second side 213. This embodiment has, but not limited to, two aspects. In practice, the contact sections of the metal hub 21 and the shaft 22 can be connected by means of laser welding in any other suitable manners. The two aspects are as follows:

First aspect: Please refer to FIG. 4A. Multiple first welding sections 25 are formed between the contact sections of the outer circumference of the shaft 22 (the outer circumference of the end of the shaft 22) and the circumference of the opening 211 on the first side 212 of the top section 214. The first welding sections 25 are annularly arranged along the outer circumference of the shaft 22 in adjacency to the first side 212. Multiple second welding sections 26 are formed between the contact sections of the outer circumference of the shaft 22 (the outer circumference of the end of the shaft 22) and the circumference of the opening 211 on the second side 213 of the top section 214. The second welding sections 26 are annularly arranged along the outer circumference of the shaft 22 in adjacency to the second side 213.

Figure 4B:
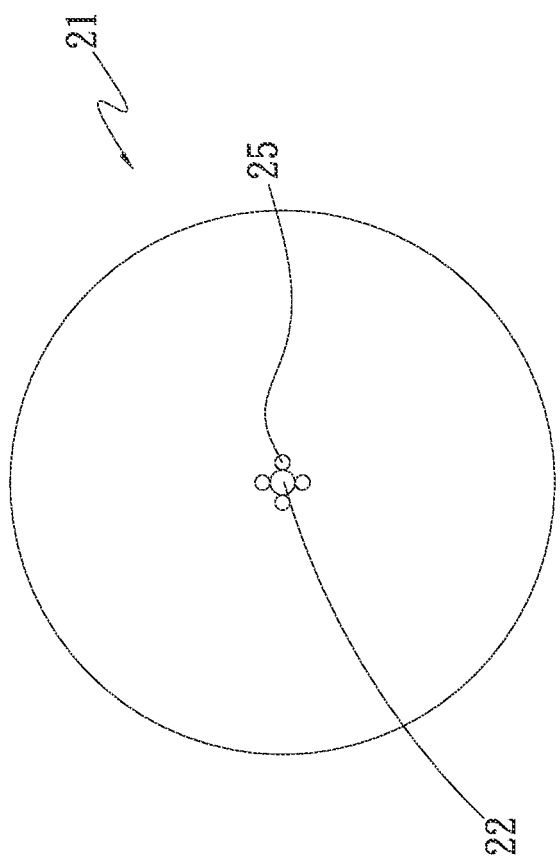
FIG. 4B is a top view of a second aspect of the first embodiment of the present invention.

Second aspect: Please refer to FIG. 4B. Multiple first welding sections 25 are formed between the contact sections of the outer circumference of the shaft 22 (the outer circumference of the end of the shaft 22) and the circumference of the opening 211 on the first side 212 of the top section 214. The first welding sections 25 are symmetrically arranged (or asymmetrically arranged). Multiple second welding sections 26 are formed between the contact sections of the outer circumference of the shaft 22 (the outer circumference of the end of the shaft 22) and the circumference of the opening 211 on the second side 213 of the top section 214. The second welding sections 26 are symmetrically arranged (or asymmetrically arranged).

According to the above arrangement, the outer circumference of the shaft 22 is integrally welded with the circumference of the opening 211 on the first and second sides 212, 213 of the top section 214 to form multiple first and second welding sections 25, 26 between the contact sections of the outer circumference of the shaft 22 and the circumference of the opening 211 on the first and second sides 212, 213. Therefore, the structural strength and connection strength between the metal member and the shaft 22 are enhanced to lower cost and avoid deformation.

Moreover, the metal member and the shaft 22 are integrally connected with each other by means of laser processing so that the shaft 22 and the metal member are concentric with each other to achieve better counterbalance.

Figure 5:
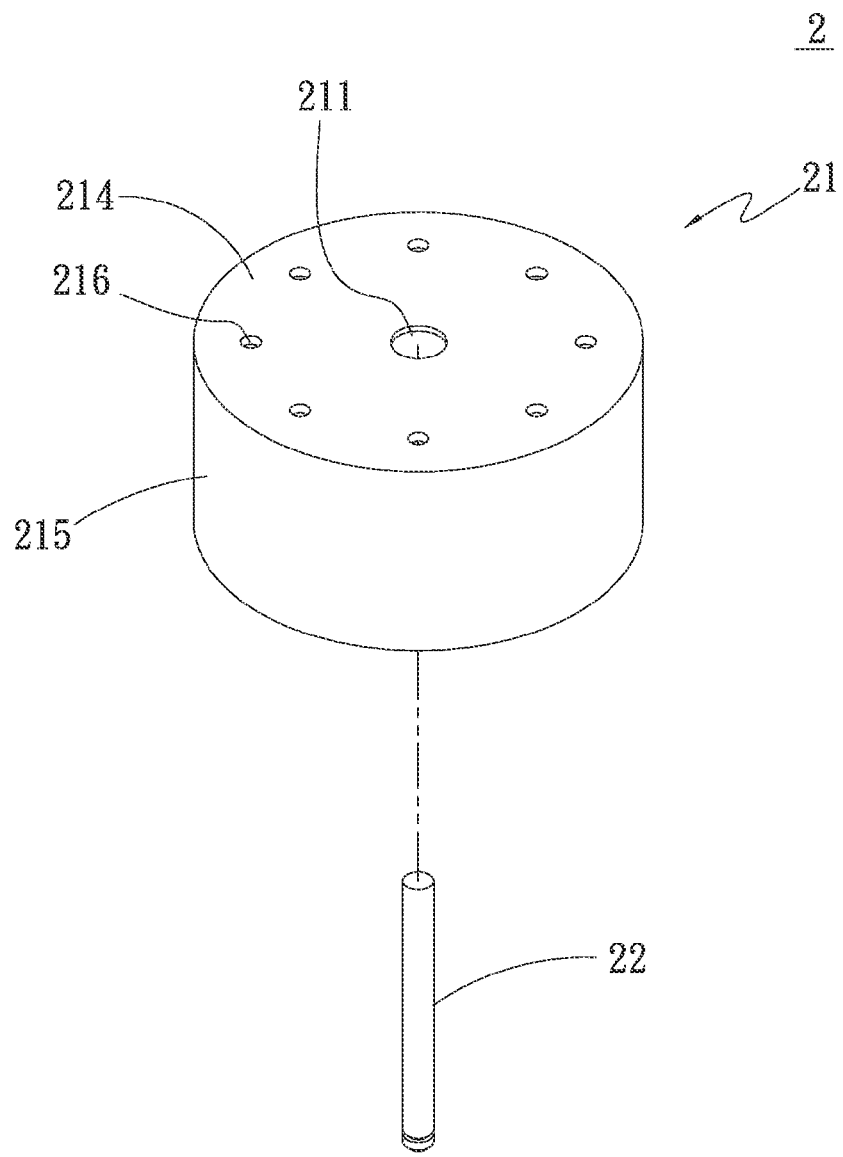
FIG. 5 is a perspective exploded view of a second embodiment of the connection structure of the present invention.
Figure 6A:
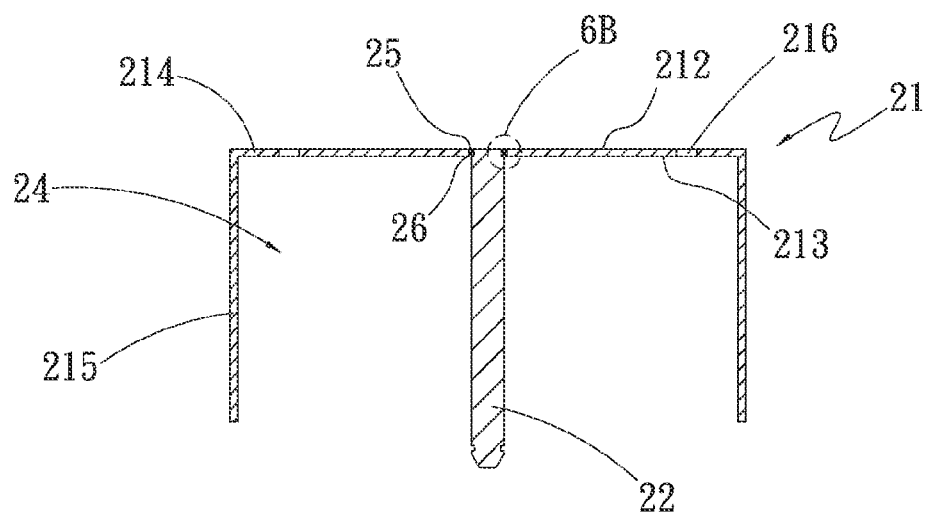
FIG. 6A is a sectional assembled view of the second embodiment of the connection structure of the present invention.
Figure 6B:
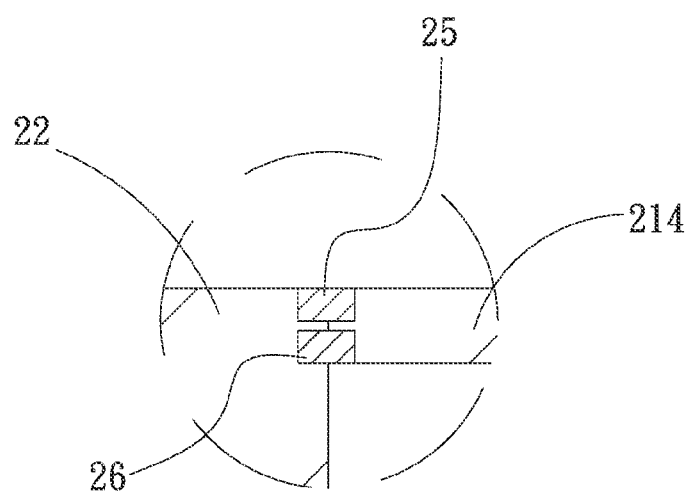
FIG. 6B is an enlarged view of circled area of FIG. 6A.
Figure 6C:
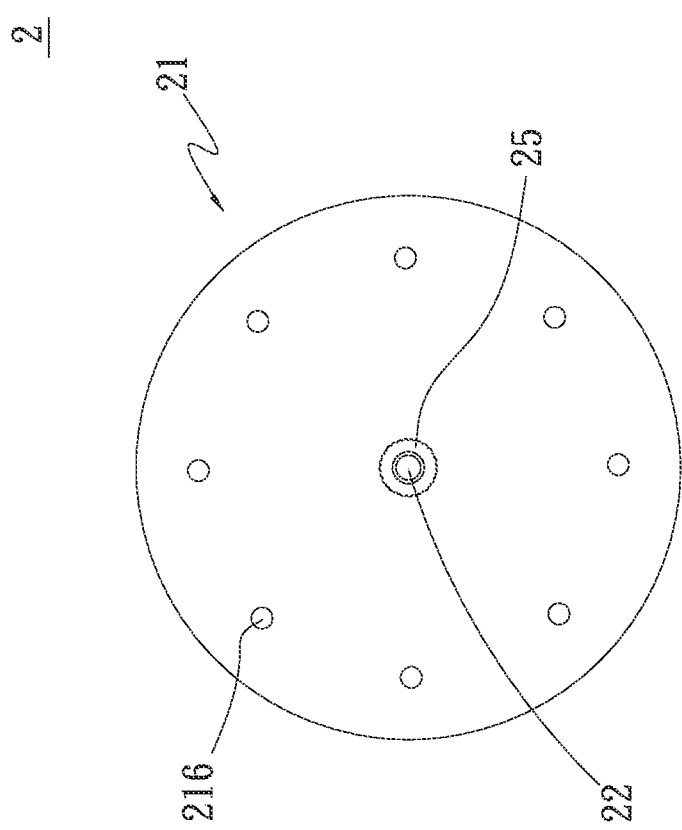
FIG. 6C is a top view of the second embodiment of the connection structure of the present invention.
Figure 7:
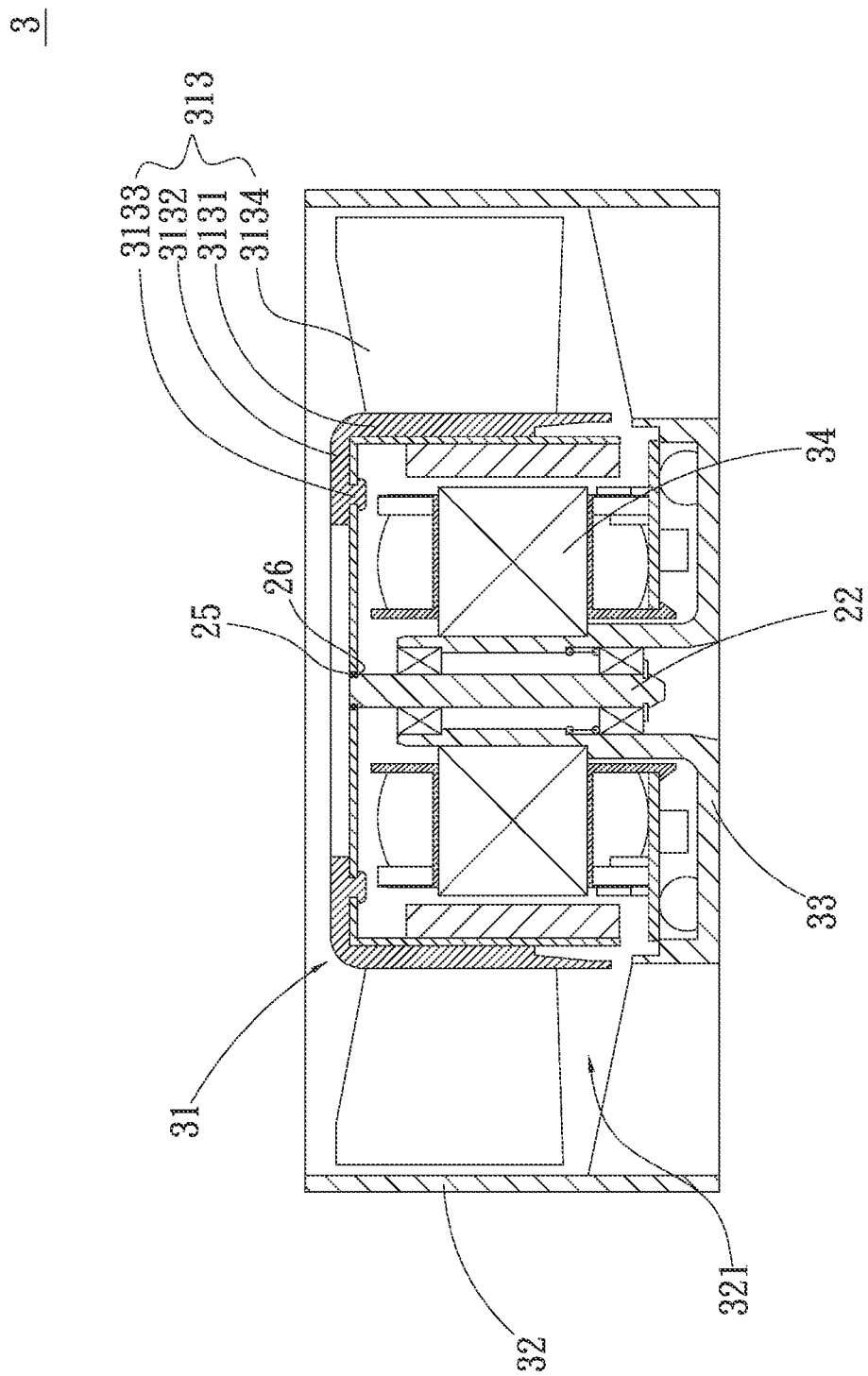
FIG. 7 is a sectional assembled view of the second embodiment of the fan of the present invention.

Please now refer to FIG. 7 as well as FIGS. 5-6C. FIG. 7 is a sectional assembled view of a second embodiment of the present invention. In the second embodiment, the connection structure of the first embodiment is applied to a fan 3. The fan 3 includes a fan impeller 31, a frame body 32, a bearing cup 33 and a stator assembly 34. The fan impeller 31 has a metal hub and a plastic blade assembly 313. In this embodiment, the metal hub is substantially identical to the metal hub 21 (the metal member) of the first embodiment in structure, connection relationship and effect and thus will not be repeatedly described. The metal hub of the second embodiment is different from the metal hub 21 of the first embodiment in that multiple holes 216 are further formed through the top section 214 of the metal hub 21 and distally spaced from the opening 216 in communication with the receiving space 24.

The metal hub 21 (the metal member) is enclosed in the blade assembly 313. That is, the blade assembly 313 is formed on the metal hub 21 by means of plastic injection molding to integrally connect with the metal hub 21 so as to form the fan impeller 31. The blade assembly 313 has a support section 3131, an extension section 3132, multiple fusion sections 3133 and multiple blades 3134. The blades 3134 are formed on an outer side of the support section 3131. An inner side of the support section 3131 is attached to the skirt section 215 of the metal hub 21 (the metal member) to enclose the skirt section 215. The extension section 3132 extends from one end of the support section 3131, (that is, the end of the support section 3131 in adjacency to the top section 214) to the multiple holes 216 of the metal hub 21. The fusion sections 3133 are formed in the holes 216 and on the inner side of the top section 214 in adjacency to the holes 216. The extension section 3132 is fused with the fusion sections 3133. Accordingly, by means of the holes 216 of the top section 214, the connection strength between the metal hub 21 and the blade assembly 313 is enhanced.

The frame body 32 has a receiving space 321 for receiving the fan impeller 31. The bearing cup 33 is disposed at the center of the receiving space 321. The stator assembly 34 is fitted on the bearing cup 33. The shaft 22 of the metal hub 21 of the fan impeller 31 is rotatably fitted in the bearing cup 33 with the metal hub 21 covering the stator assembly 34.

In the case that the connection structure 2 of the present invention is applied to a fan 3 with great torque or small torque, by means of the first and second welding sections 25, 26, the structural strength and connection strength between the metal hub 21 and the shaft 22 of the fan impeller 31 are greatly enhanced to avoid detachment of the shaft 22 of the fan impeller 31. Moreover, the cost is lowered and a better counterbalance of the fan impeller 31 is achieved. In addition, the connection structure 2 of the present invention can be applied to the fan 3 to solve the problem of the conventional fan that the copper sleeve has a considerable thickness to occupy the internal use space of the fan impeller 31.

Figure 8:
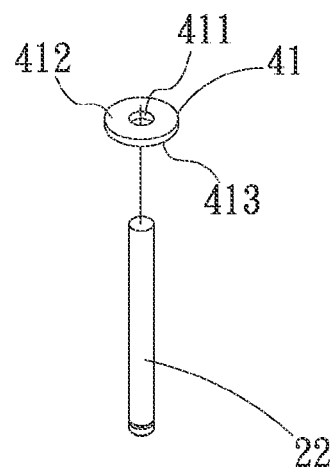
FIG. 8 is a perspective exploded view of a third embodiment of the present invention.
Figure 9A:
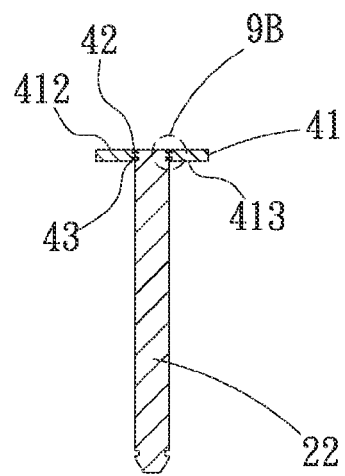
FIG. 9A is a sectional assembled view of a third embodiment of the present invention.
Figure 9B:
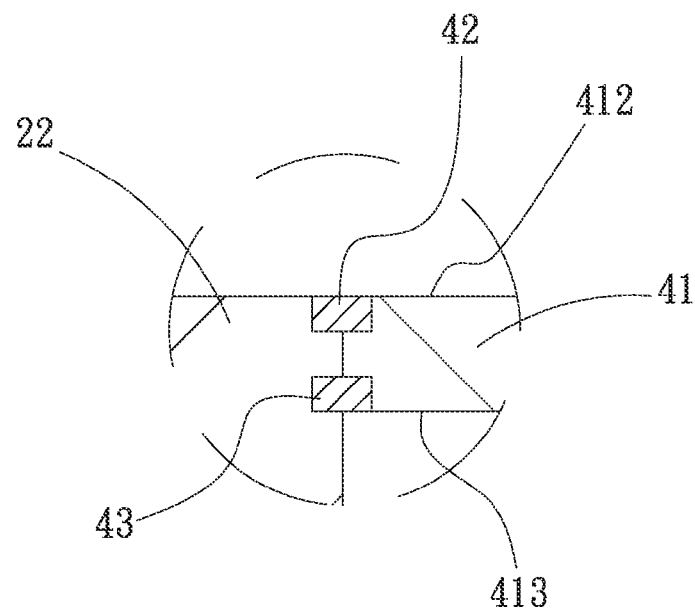
FIG. 9B is an enlarged view of circled area of FIG. 9A.

Please now refer to FIGS. 8 and 9A as well as FIG. 9B. FIG. 8 is a perspective exploded view of a third embodiment of the present invention. FIG. 9A is a sectional assembled view of the third embodiment of the present invention. In the third embodiment, the metal member is a metal plate body 41 or a metal ring plate body 41 rather than the metal hub 21 of the first embodiment. That is, in the third embodiment, the metal member is a metal ring plate body 41 for illustration. The metal ring plate body 41 (the metal member) has an opening 411, a first side 412 and a second side 413 opposite to the first side 412. The opening 411 is formed through a center of the metal ring plate body 41.

The shaft 22 is inserted in the opening 411. In this embodiment, one end of the shaft 22 is inserted in the opening 411. An end face of the end of the shaft 22 is flush with the first side 412 of the metal ring plate body 41.

Alternatively, in practice, the length of the shaft 22 in the opening 411 can be adjusted according to the use space and application requirements. For example, the end of the shaft 22 can outward protrude from the opening 411.

In addition, an outer circumference of the shaft 22 (the outer circumference of the end of the shaft 22) is welded with a circumference of the opening 411 on the first side 412 of the metal ring plate body 41 by means of laser processing (such as laser welding) to form at least one first welding section 42 between the contact sections of the outer circumference of the shaft 22 and the circumference of the opening 411 on the first side 412. That is, the first welding section 42 is connected between the outer circumference of the shaft 22 and the circumference of the opening 411 on the first side 412. The outer circumference of the shaft 22 (the outer circumference of the end of the shaft 22) is also welded with a circumference of the opening 411 on the second side 413 of the metal ring plate body 41 (the metal member) by means of laser processing (such as laser welding) to form at least one second welding section 43 between the contact sections of the outer circumference of the shaft 22 and the circumference of the opening 411 on the second side 413. That is, the second welding section 43 is connected between the outer circumference of the shaft 22 and the circumference of the opening 411 on the second side 413. Via the first and second welding sections 42, 43, the metal ring plate body 41 (the metal member) is integrally connected with the shaft 22 by means of laser welding to effectively enhance the structural strength and connection strength between the metal ring plate body 41 and the shaft 22 and prevent the shaft 22 from loosening from the metal ring plate body 41. The laser processing can be single-point or multipoint laser beam.

The first welding section 42 is connected between the outer circumference of the shaft 22 and the circumference of the opening 411 on the first side 412 and the second welding section 43 is connected between the outer circumference of the shaft 22 and the circumference of the opening 411 on the second side 413. This embodiment has two practical aspects substantially identical to those of the first embodiment and thus will not be repeatedly described hereinafter.

According to the above arrangement, the outer circumference of the shaft 22 is integrally welded with the circumference of the opening 411 on the first and second sides 412, 413 to form multiple first and second welding sections 42, 43 between the contact sections of the outer circumference of the shaft 22 and the circumference of the opening 411 on the first and second sides 412, 413. Therefore, the structural strength and connection strength between the metal member and the shaft 22 are enhanced to lower cost and avoid deformation. Moreover, the metal member and the shaft 22 are integrally connected with each other by means of laser processing so that the shaft 22 and the metal member are concentric with each other to achieve better counterbalance.

Figure 10:
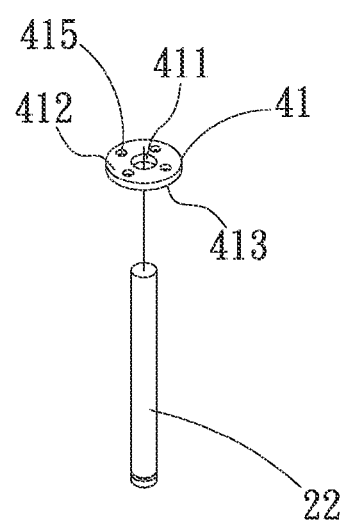
FIG. 10 is a perspective exploded view of a fourth embodiment of the connection structure of the present invention.
Figure 11A:
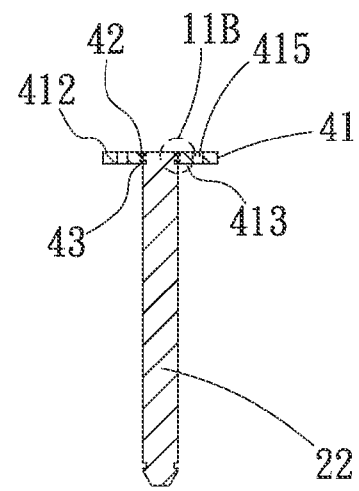
FIG. 11A is a sectional assembled view of the fourth embodiment of the connection structure of the present invention.
Figure 11B:
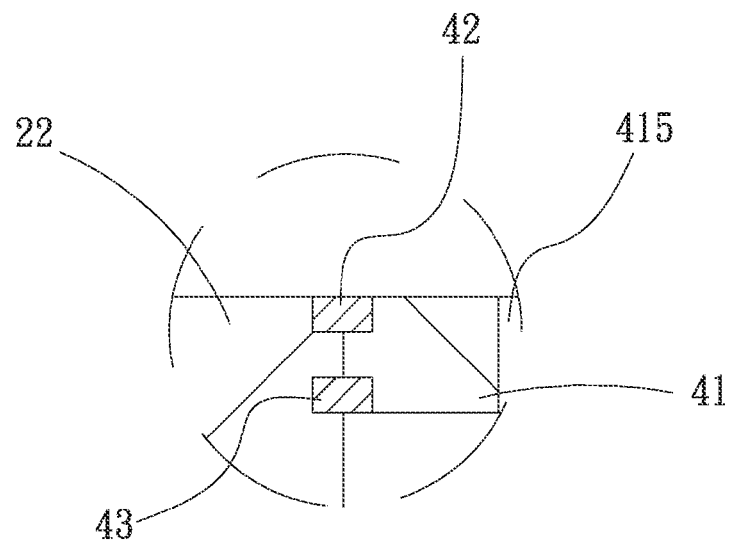
FIG. 11B is an enlarged view of circled area of FIG. 11A.
Figure 12:
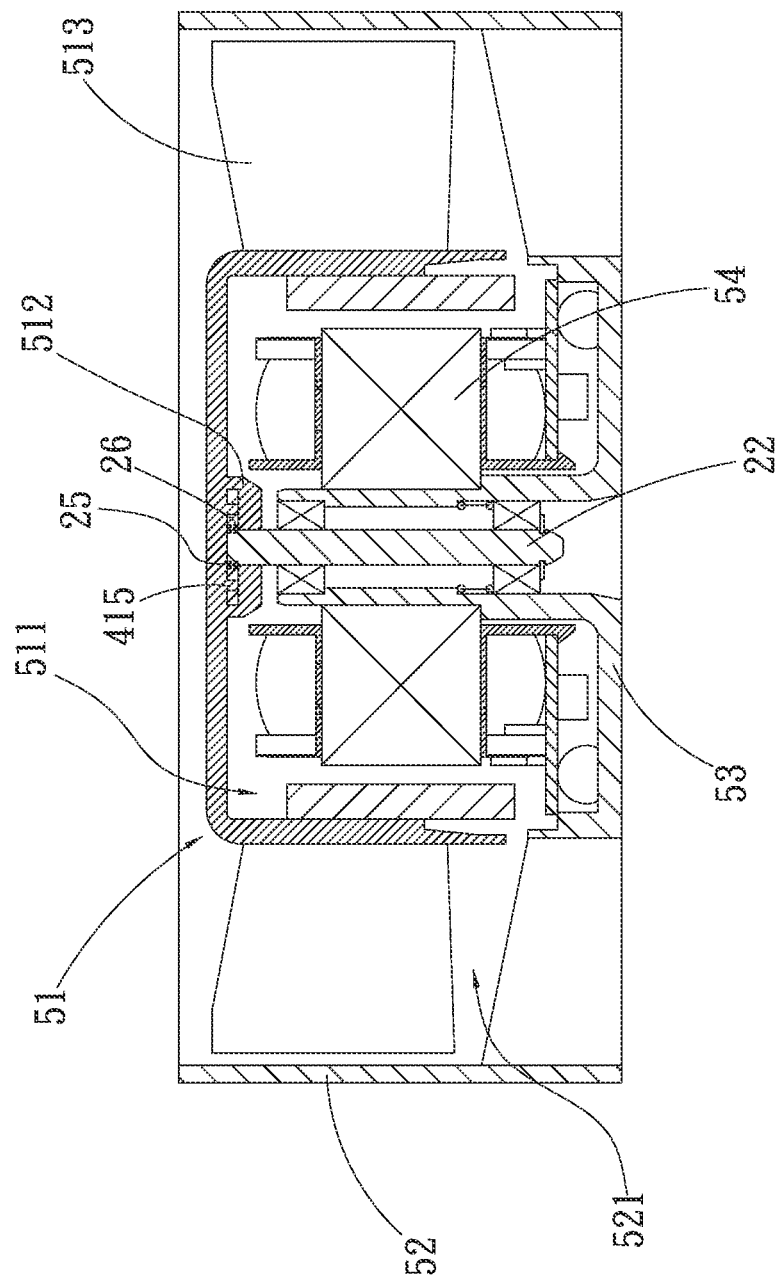
FIG. 12 is a sectional assembled view of the fourth embodiment of the fan of the present invention.

Please now refer to FIG. 12 as well as FIGS. 10-11B. FIG. 12 is a sectional assembled view of a fourth embodiment of the present invention. In the fourth embodiment, the connection structure 2 of the third embodiment is applied to a fan 5. The fan 5 includes a fan impeller 51, a frame body 52, a bearing cup 53 and a stator assembly 54. The fan impeller 51 is made of plastic material by injection molding to integrally enclose the metal ring plate body 41 (the metal member) connected with the shaft 22. The metal ring plate body 41 (the metal member) is formed with multiple perforations 415, which are formed through the metal ring plate body 41 and distally spaced from the opening 411.

The fan impeller 51 has a receiving space 511, a connection section 512 and multiple blades 513. The shaft 22 is disposed in the receiving space 511. The blades 513 are formed on an outer circumference of the fan impeller 51. The connection section 512 is disposed at a center of bottom side of the receiving space 511 to enclose the metal ring plate body 41 and a part of the shaft 22 in adjacency to the metal ring plate body 41 and the perforations 415. By means of the perforations 415 of the metal ring plate body 41, the connection strength between the fan impeller 51 and the metal member is enhanced.

The frame body 52 has a receiving space 521 for receiving the fan impeller 51. The bearing cup 53 is disposed at the center of the receiving space 521. The stator assembly 54 is fitted on the bearing cup 53. The shaft 22 of the metal ring plate body 41 of the fan impeller 51 is rotatably fitted in the bearing cup 53 with the fan impeller 51 covering the stator assembly 54.

In the case that the connection structure of the present invention is applied to a fan 5 with great torque or small torque, by means of the first and second welding sections 42, 43, the structural strength and connection strength between the metal member and the shaft 22 are enhanced to achieve better counterbalance of the fan impeller 51 and avoid detachment of the shaft 22. Moreover, the cost is lowered.

Figure 13:
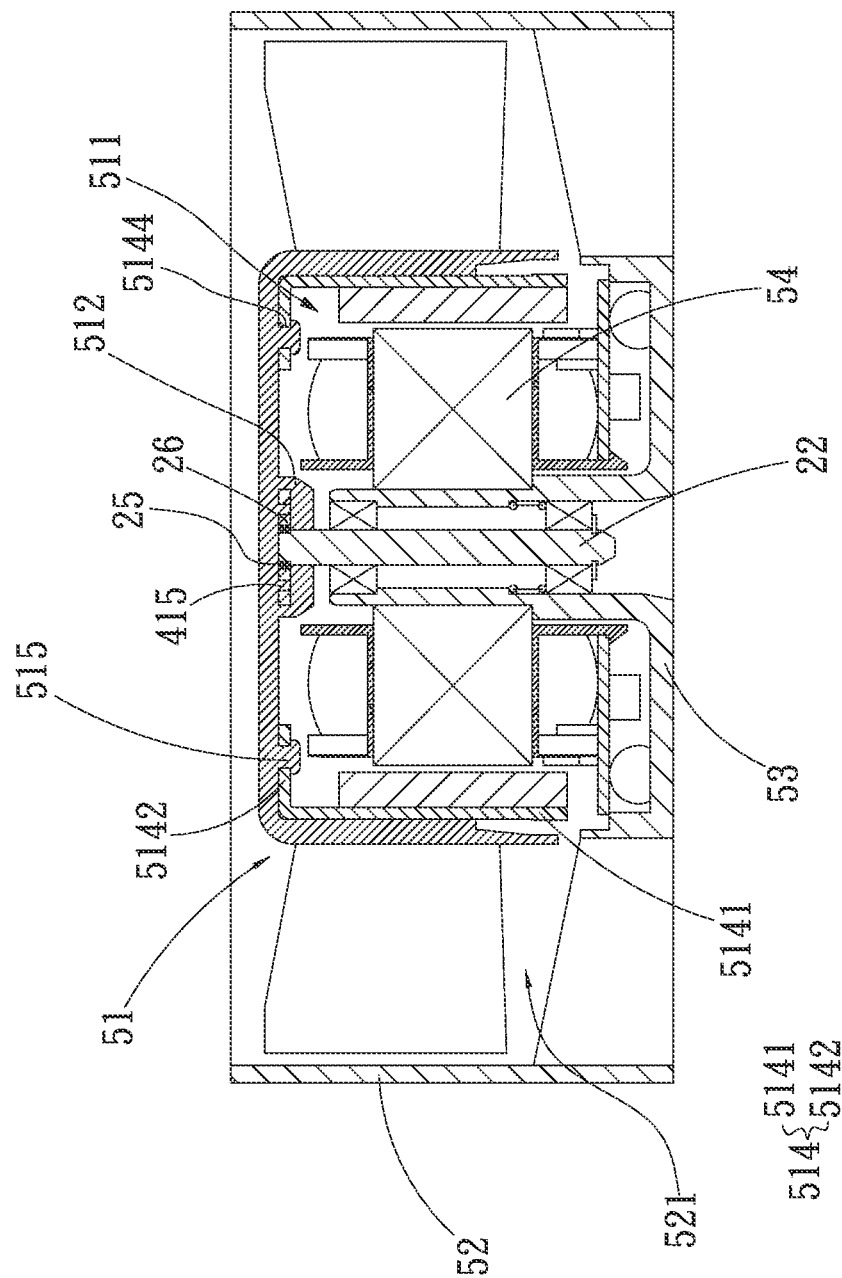
FIG. 13 is a sectional assembled view of the fifth embodiment of the fan of the present invention.

Please now refer to FIG. 13, which is a sectional assembled view of a fifth embodiment of the present invention. The fifth embodiment is substantially identical to the fourth embodiment in structure, connection relationship and effect and thus will not be repeatedly described. The fifth embodiment is different from the fourth embodiment in that the fan impeller 51 further includes a metal casing 514 and multiple fusion sections 515. In this embodiment, the metal casing 514 is made of, but not limited to, iron material for illustration purposes only. In practice, the metal casing 514 can be also made of copper, aluminum alloy or any other suitable metal material.

The metal casing 514 and the metal member (the metal ring plate body 41) are integrally enclosed in the fan impeller 51 by injection molding. The metal casing 514 has a support skirt section 5141 and a support top section 5142. The support skirt section 5141 is attached to inner side of the fan impeller 51. The support top section 5142 extends from one end of the support skirt section 5141, which end is adjacent to the bottom side of the receiving space 511 to the shaft 22. Multiple through holes 5144 are formed through the support top section 5142 in communication with the receiving space 511. The fusion sections 515 are formed on one side of the support top section 5142, which side is distal to the bottom side of the receiving space 511 and correspondingly formed in the through holes 5144 and fused with the bottom side of the receiving space 511.

The metal casing 514 is enclosed in the fan impeller 51 to enhance the structural strength of the fan impeller 51. Also, by means of the through holes 5144, the connection strength between the metal casing 514 and the fan impeller 51 is enhanced.

Figure 14:
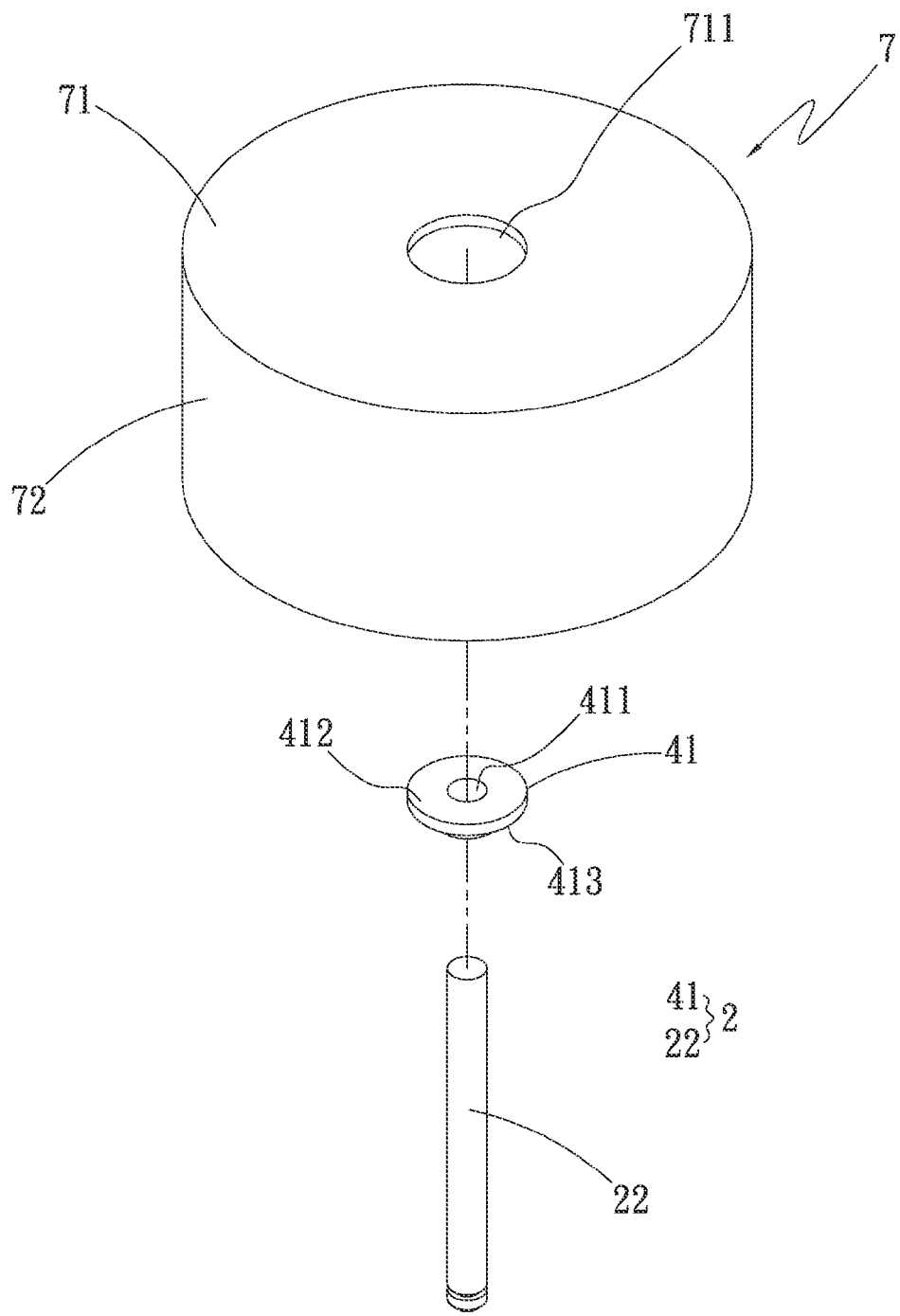
FIG. 14 is a perspective exploded view of a sixth embodiment of the present invention.
Figure 15A:
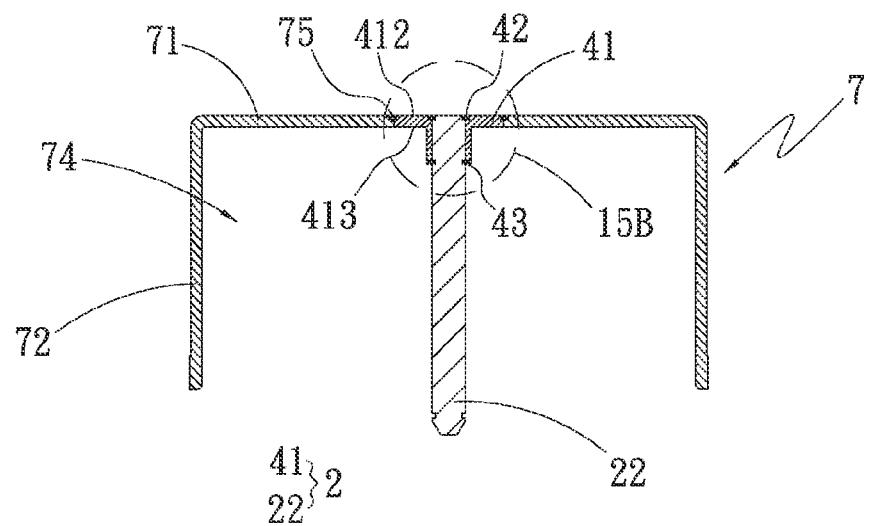
FIG. 15A is a sectional assembled view of the sixth embodiment of the present invention.
Figure 15B:
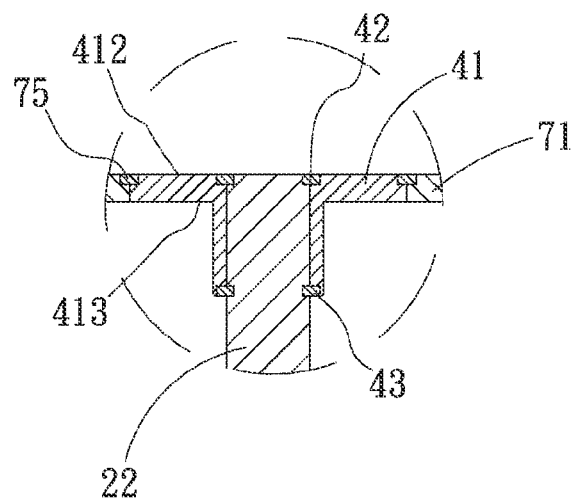
FIG. 15B is an enlarged view of circled area of FIG. 15A.
Figure 15C:
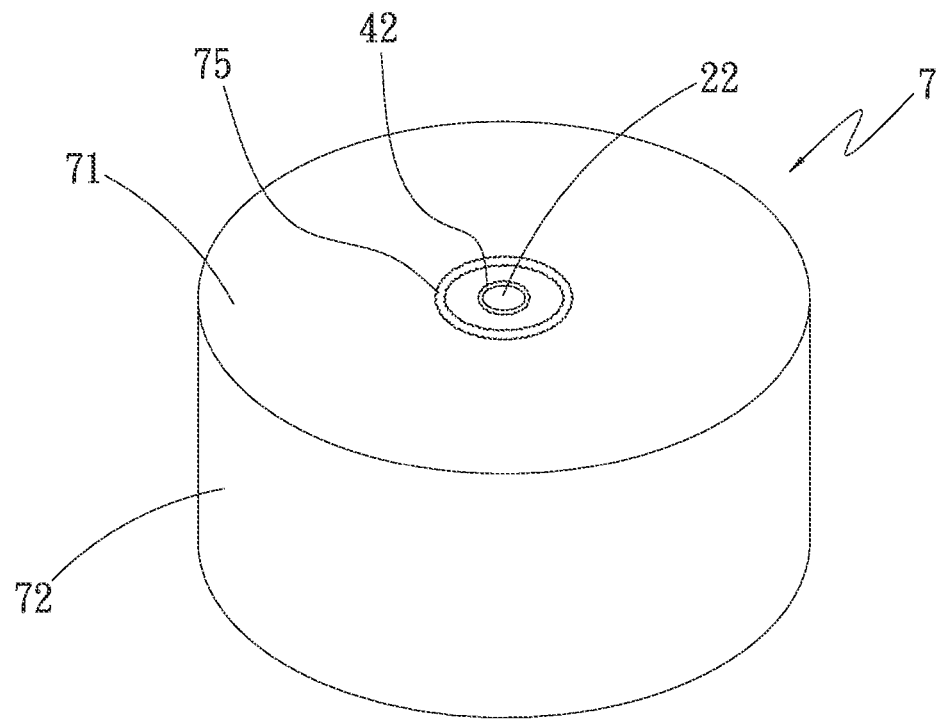
FIG. 15C is a perspective assembled view of the sixth embodiment of the present invention.

Please now refer to FIGS. 14 and 15A as well as FIGS. 15B and 15C. FIG. 14 is a perspective exploded view of a sixth embodiment of the present invention. FIG. 15A is a sectional assembled view of the sixth embodiment of the present invention. The sixth embodiment is substantially identical to the third embodiment in structure, connection relationship and effect and thus will not be repeatedly described. The sixth embodiment is different from the third embodiment in that the metal member (the metal ring plate body 41) of the third embodiment is mated with a metal casing 7. The metal casing 7 has a support top section 71 and a support skirt section 72 axially extending from a circumference of the support top section 71. The support top section 71 of the metal casing 7 is formed with a connection hole 711, which is formed through a center of the support top section 71 in communication with a receiving space 74 defined by the support top section 71 and the support skirt section 72. The metal ring plate body 41 (the metal member) is received in the connection hole 711.

The first side 412 of the metal ring plate body 41 is welded with a circumference of the connection hole 711 on outer side of the support top section 71 of the metal casing 7 by means of laser processing (such as laser welding) to form at least one third welding section 75 between the contact sections of the first side 412 of the metal ring plate body 41 and the circumference of the connection hole 711 on the outer side of the support top section 71. That is, the third welding section 75 is connected between the first side 412 and the circumference of the connection hole 711 on the outer side of the support top section 71. The laser processing can be single-point or multipoint laser beam.

By means of the third welding section 75, the metal ring plate body 41 (the metal member) is integrally connected with the metal casing 7 to form a metal hub. Accordingly, the structural strength of the metal hub is enhanced. Moreover, via the first and second welding sections 42, 43, the structural strength and connection strength between the metal ring plate body 41 and the shaft 22 are enhanced and the shaft 22 is prevented from loosening from the metal ring plate body 41.

Figure 16:
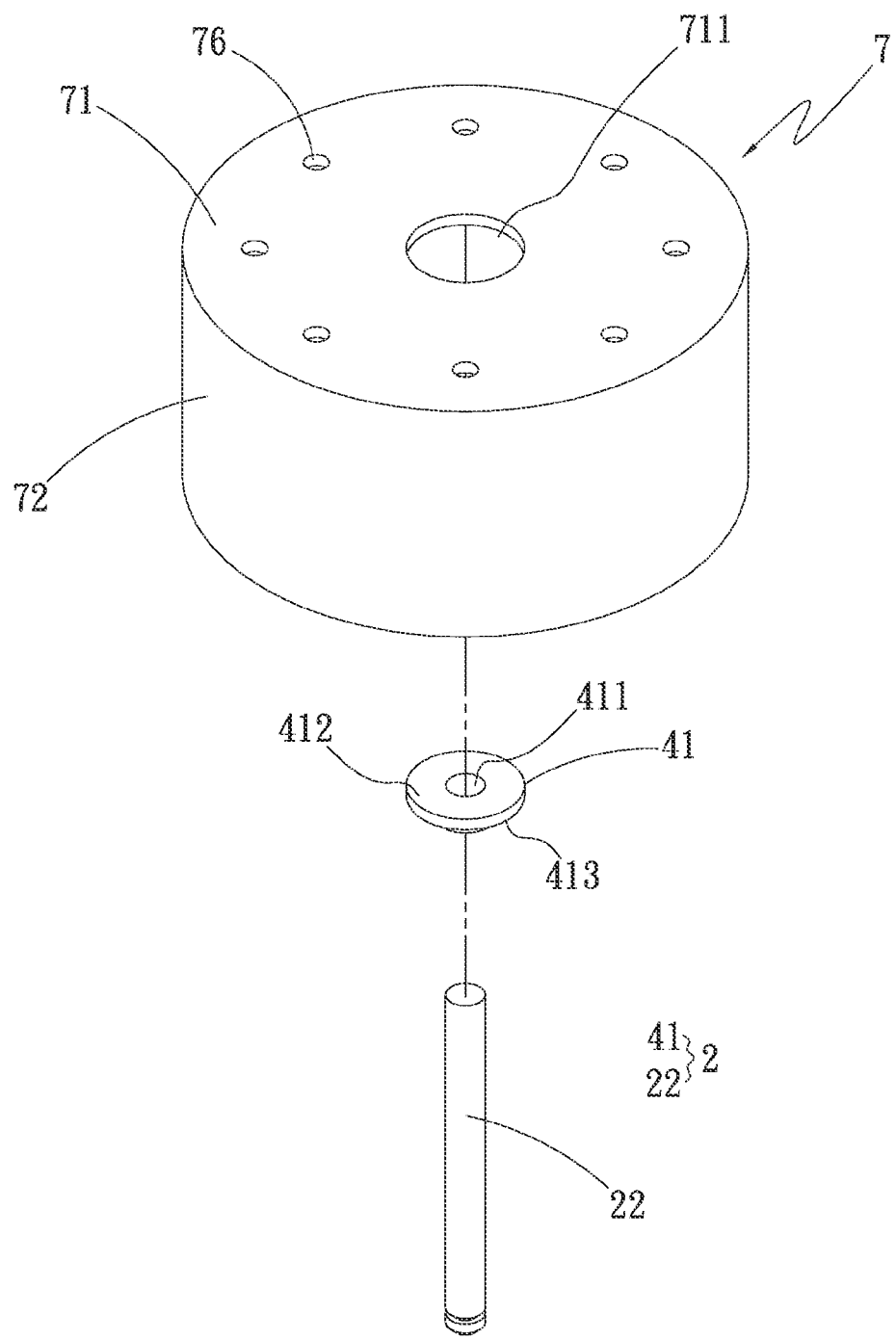
FIG. 16 is a perspective exploded view of a seventh embodiment of the connection structure of the present invention.
Figure 17A:
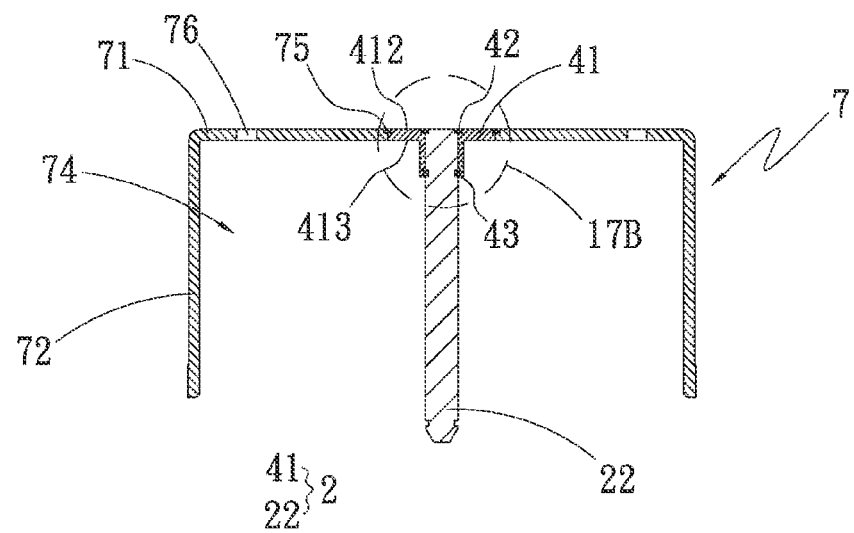
FIG. 17A is a sectional assembled view of the seventh embodiment of the connection structure of the present invention.
Figure 17B:
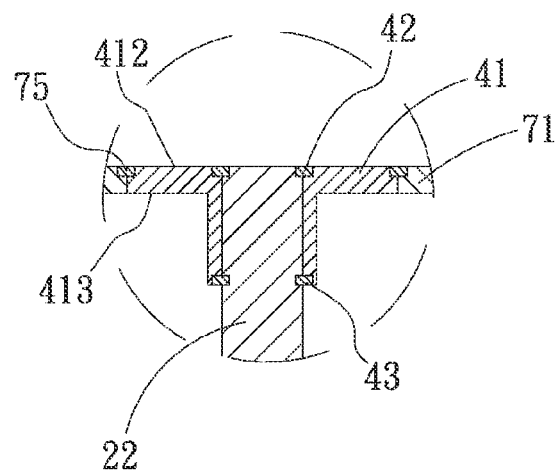
FIG. 17B is an enlarged view of circled area of FIG. 17A.
Figure 17C:
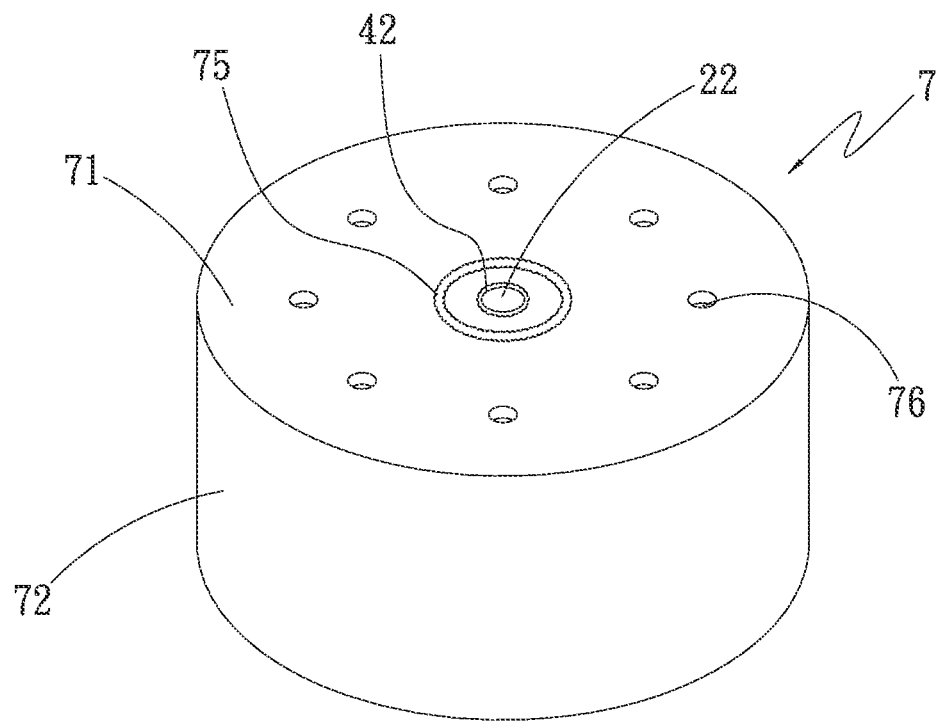
FIG. 17C is a perspective assembled view of the seventh embodiment of the connection structure of the present invention.
Figure 18:
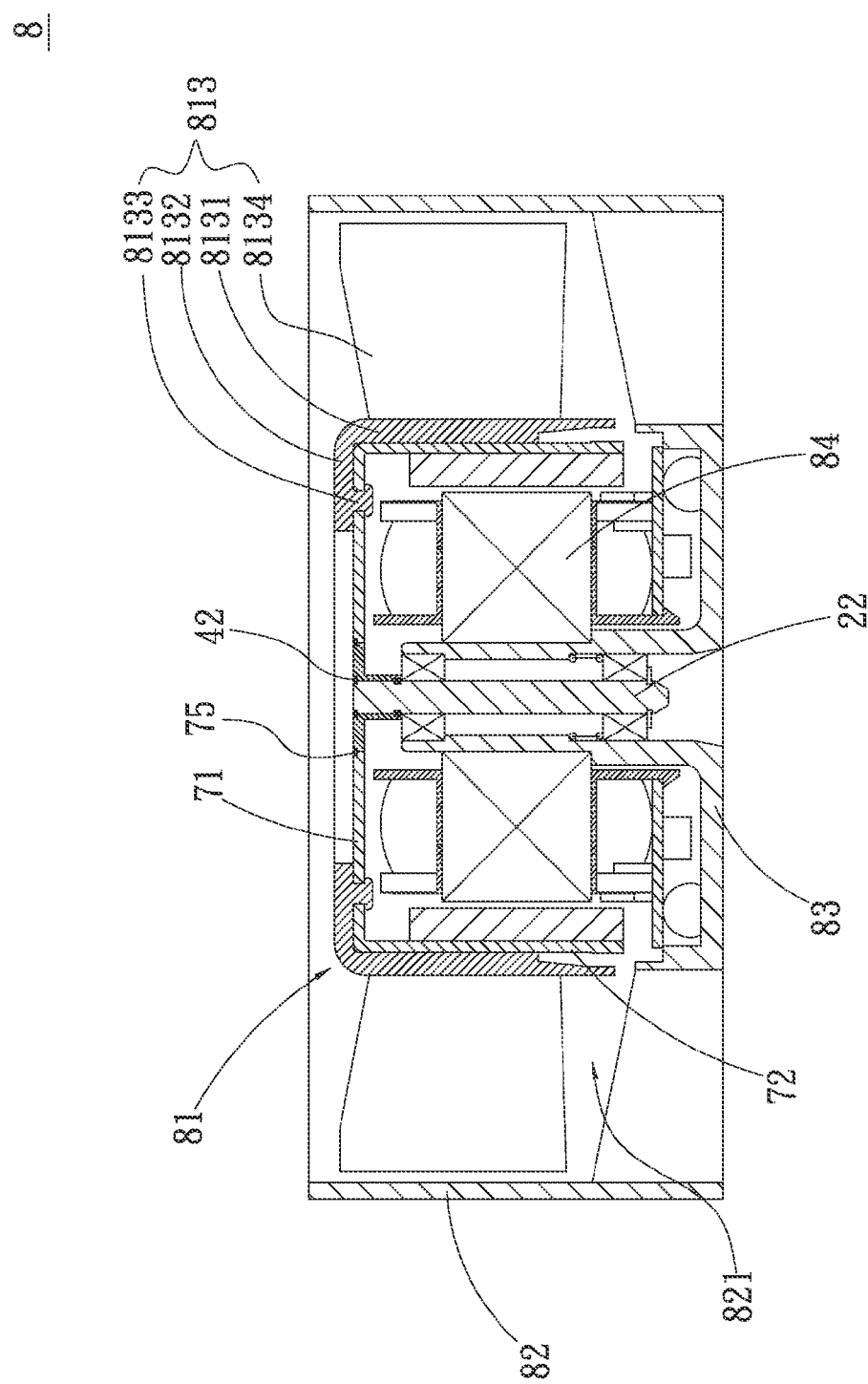
FIG. 18 is a sectional assembled view of the seventh embodiment of the fan of the present invention.

Please now refer to FIG. 18 as well as FIGS. 16-17C. FIG. 18 is a sectional assembled view of a seventh embodiment of the present invention. In the seventh embodiment, the connection structure 2 of the sixth embodiment is applied to a fan 8. The fan 8 includes a fan impeller 81, a frame body 82, a bearing cup 83 and a stator assembly 84. The fan impeller 81 has a metal hub and a plastic blade assembly 813. In this embodiment, the metal hub is substantially identical to the metal hub of the sixth embodiment that is composed of the metal ring plate body 41 (the metal member) and the metal casing 7 in structure, connection relationship and effect and thus will not be repeatedly described. The metal hub of the seventh embodiment is different from the metal hub of the sixth embodiment in that multiple through holes 76 are formed through the support top section 71 of the metal casing 7 and distally spaced from the connection hole 711 in communication with the receiving space 74.

The metal casing 7 is enclosed in the blade assembly 813. That is, the blade assembly 813 is formed on the metal casing 7 by means of plastic injection molding to integrally connect with the metal casing 7 and the metal ring plate body 41 so as to form the fan impeller 81. The blade assembly 813 has a support section 8131, an extension section 8132, multiple fusion sections 8133 and multiple blades 8134. The blades 8134 are formed on an outer side of the support section 8131. An inner side of the support section 8131 is attached to the support skirt section 72 of the metal casing 7 to enclose the support skirt section 72. The extension section 8132 extends from one end of the support section 8131, (that is, the end of the support section 8131 in adjacency to the support top section 71) to the multiple through holes 76 of the support top section 71 of the metal casing 7. The fusion sections 8133 are formed in the through holes 76 and on the inner side of the support top section 71 in adjacency to the through holes 76. The extension section 8132 is fused with the fusion sections 8133. Accordingly, by means of the through holes 76 of the support top section 71, the connection strength between the metal casing 7 and the blade assembly 813 is enhanced.

The frame body 82 has a receiving space 821 for receiving the fan impeller 81. The bearing cup 83 is disposed at the center of the receiving space 821. The stator assembly 84 is fitted on the bearing cup 83. The shaft 22 of the metal ring plate body 41 of the fan impeller 81 is rotatably fitted in the bearing cup 83 with the fan impeller 81 covering the stator assembly 84.

In the case that the connection structure 2 of the present invention is applied to a fan 8 with great torque or small torque, the metal casing 7 is integrally connected with the metal ring plate body 41 by means of laser welding to form the third welding section 75, whereby the structural strength of the metal hub is enhanced. Moreover, by means of the first and second welding sections 42, 43, the structural strength and connection strength between the metal ring plate body 41 and the shaft 22 are greatly enhanced to avoid detachment of the shaft 22 of the fan impeller 81. Moreover, the cost is lowered and a better counterbalance of the fan impeller 81 is achieved.

Figure 19:
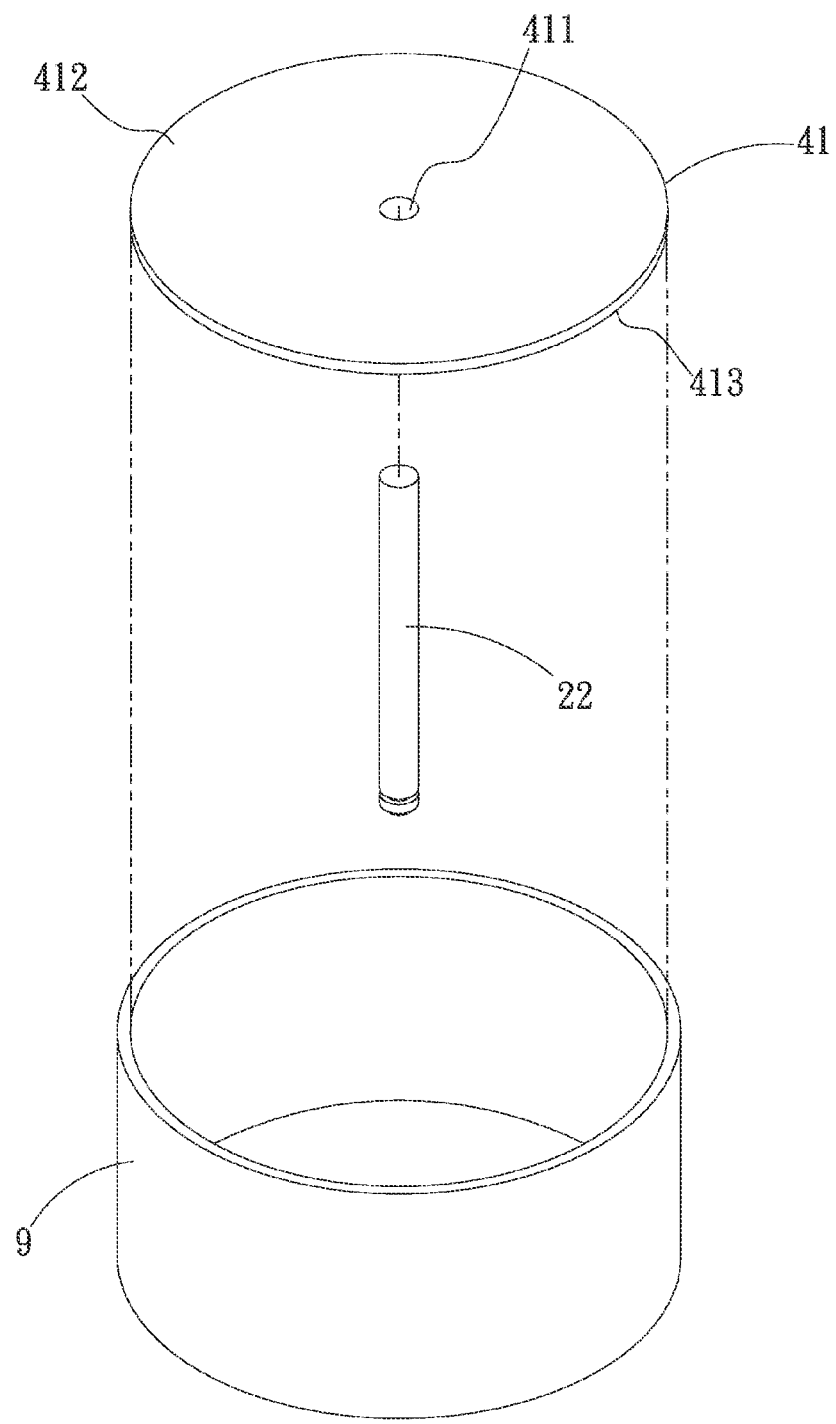
FIG. 19 is a perspective exploded view of an eighth embodiment of the present invention.
Figure 20A:
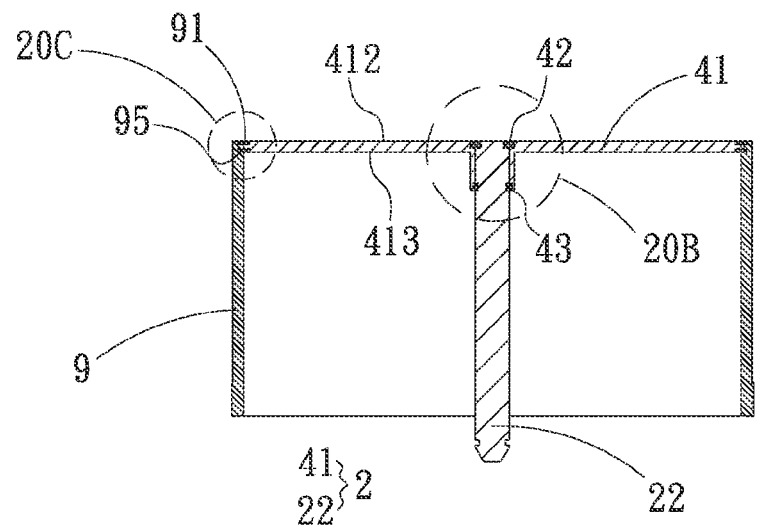
FIG. 20A is a sectional assembled view of the eighth embodiment of the present invention.
Figure 20B:
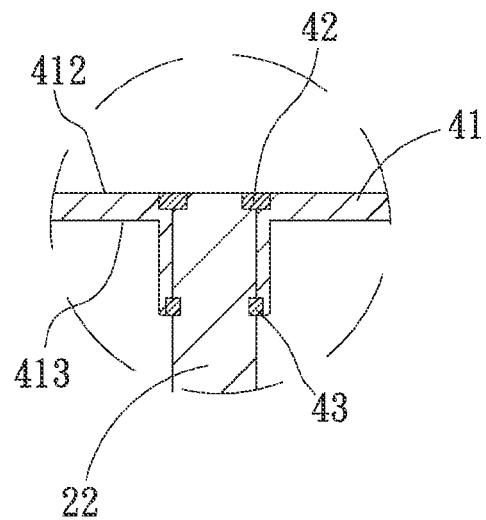
FIG. 20B is an enlarged view of circled area of FIG. 20A.
Figure 20C:
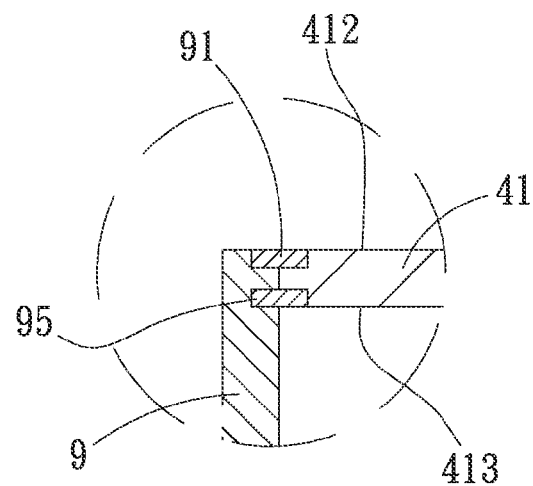
FIG. 20C is an enlarged view of another circled area of FIG. 20A.
Figure 20D:
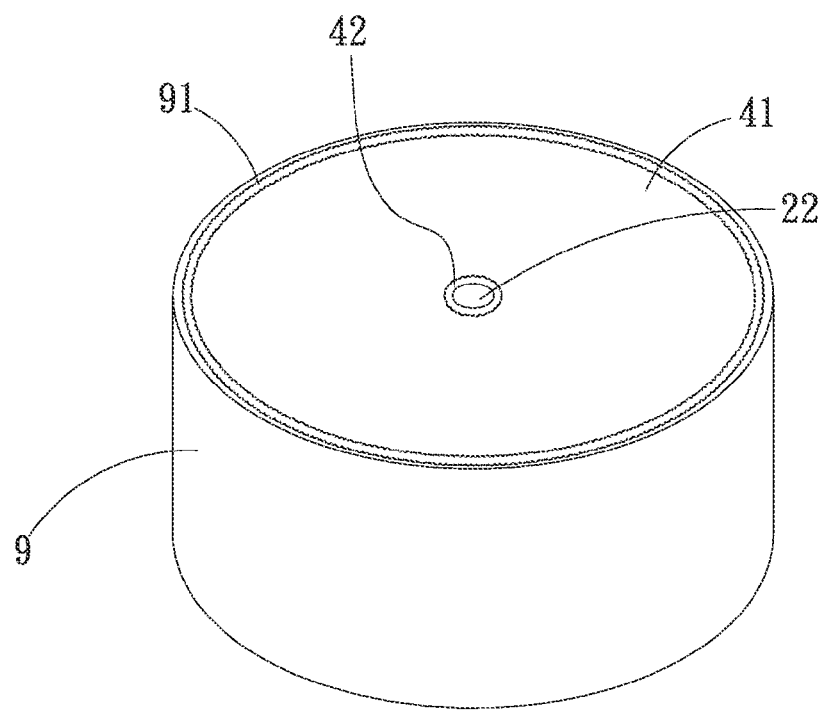
FIG. 20D is a perspective assembled view of the eighth embodiment of the present invention.
Figure 21A:
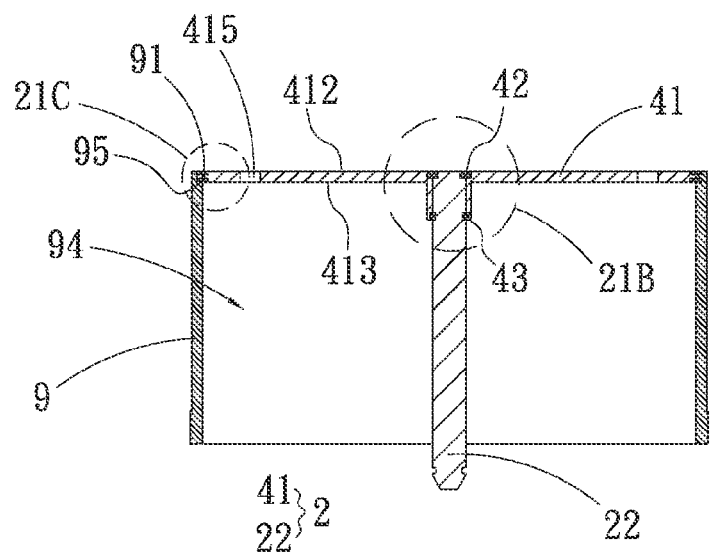
FIG. 21A is a sectional assembled view of a ninth embodiment of the connection structure of the present invention.
Figure 21B:
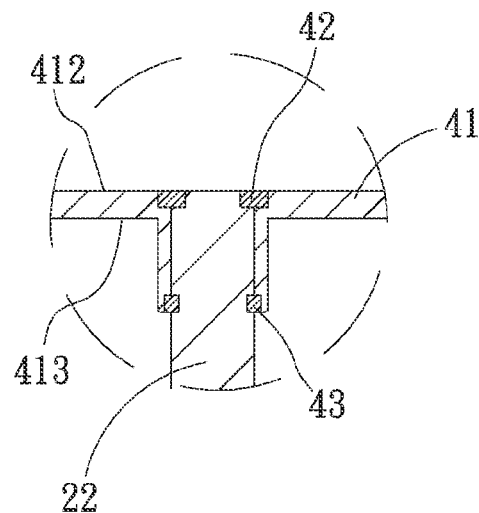
FIG. 21B is an enlarged view of circled area of FIG. 21A.
Figure 21C:
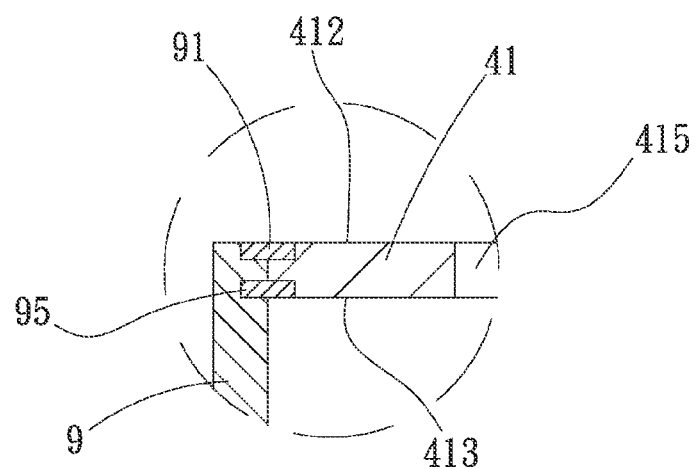
FIG. 21C is an enlarged view of another circled area of FIG. 21A.
Figure 21D:
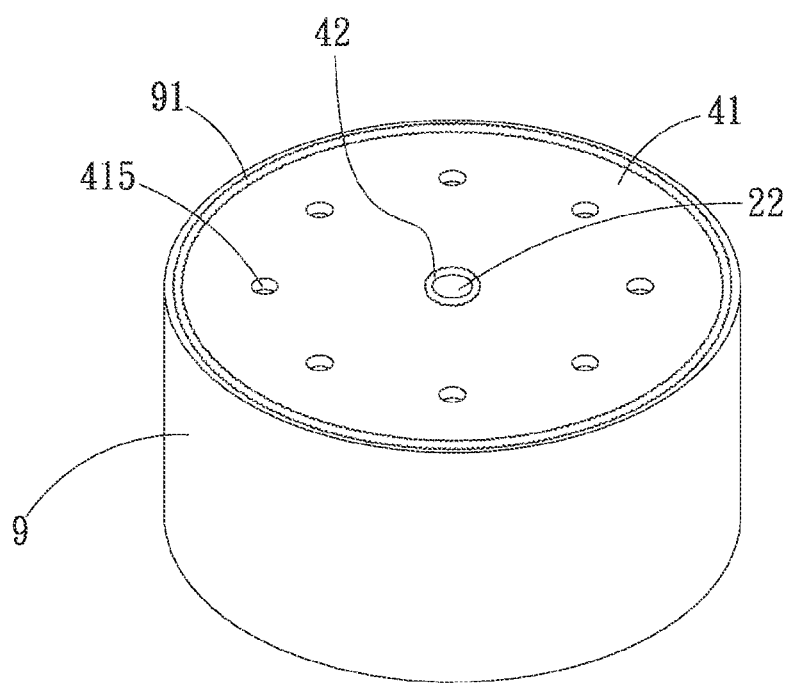
FIG. 21D is a perspective assembled view of the ninth embodiment of the connection structure of the present invention.

Please now refer to FIGS. 19 and 20A as well as FIGS. 20B-20D. FIG. 19 is a perspective exploded view of an eighth embodiment of the present invention. FIG. 20A is a sectional assembled view of the eighth embodiment of the present invention. The eighth embodiment is substantially identical to the third embodiment in structure, connection relationship and effect and thus will not be repeatedly described. The eighth embodiment is different from the third embodiment in that a circumference of the metal member (the metal ring plate body 41) is mated with a metal ring body 9. In this embodiment, the metal ring body 9 is made of, but not limited to, iron material. In practice, alternatively, the metal ring body 9 can be also made of copper, aluminum alloy or any other suitable metal material.

A top end of the metal ring body 9 is flush with the first side 412 of the metal ring plate body 41 (the metal member). The top end of the metal ring body 9 is welded with the first side 412 of the metal ring plate body 41 in adjacency to the circumference of the metal ring plate body 41 by means of laser processing (such as laser welding) to form at least one fourth welding section 91 between the contact sections of the top end of the metal ring body 9 and the first side 412 of the metal ring plate body 41. That is, the fourth welding section 91 is connected between the first side 412 of the metal ring plate body 41 (the metal member) in adjacency to the circumference of the metal ring plate body 41 and the top end of the metal ring body 9. The laser processing can be single-point or multipoint laser beam.

In addition, an inner side of the metal ring body 9 is welded with the second side 413 of the metal ring plate body 41 (the metal member) in adjacency to the circumference of the metal ring plate body 41 by means of laser processing (such as laser welding) to form at least one fifth welding section 95 between the contact sections of the inner side of the metal ring body 9 and the second side 413 of the metal ring plate body 41. That is, the fifth welding section 95 is connected between the second side 413 of the metal ring plate body 41 (the metal member) in adjacency to the circumference of the metal ring plate body 41 and the inner side of the metal ring body 9. By means of the fourth and fifth welding sections 91, 95, the metal ring plate body 41 is integrally connected with the metal ring body 9 to form a metal hub. Accordingly, the structural strength of the metal hub is enhanced. Moreover, via the first and second welding sections 42, 43, the structural strength and connection strength between the metal ring plate body 41 and the shaft 22 are enhanced and the shaft 22 is prevented from loosening from the metal ring plate body 41.

Figure 22:
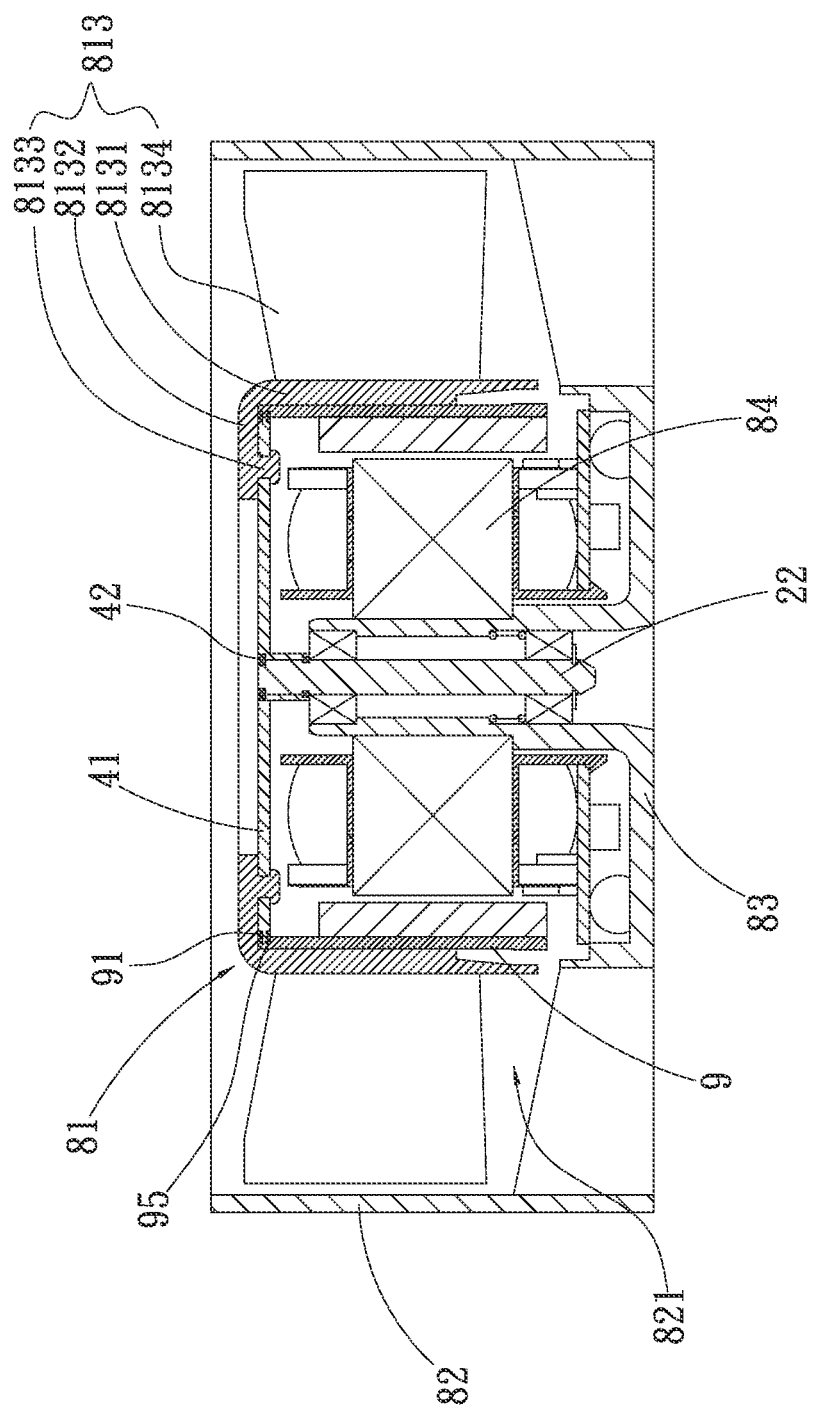
FIG. 22 is a sectional assembled view of the ninth embodiment of the fan of the present invention.

Please now refer to FIG. 22 as well as FIGS. 21A-21D. FIG. 22 is a sectional assembled view of a ninth embodiment of the present invention. In the ninth embodiment, the connection structure 2 of the eighth embodiment is applied to a fan 8. The fan 8 includes a fan impeller 81, a frame body 82, a bearing cup 83 and a stator assembly 84. The fan impeller 81 has a metal hub and a plastic blade assembly 813. In this embodiment, the metal hub is substantially identical to the metal hub of the eighth embodiment that is composed of the metal ring plate body 41 (the metal member) and the metal ring body 9 in structure, connection relationship and effect and thus will not be repeatedly described. The metal hub of the ninth embodiment is different from the metal hub of the eighth embodiment in that the metal ring plate body 41 of the metal hub has multiple perforations 415. The perforations 415 are formed through the metal ring plate body 41 (the metal member) and distally spaced from the opening 411 (as shown in FIG. 19). The metal ring plate body 41 and the metal ring body 9 together define a receiving space 94 for receiving the shaft 22.

The metal ring plate body 41 and the metal ring body 9 are enclosed in the blade assembly 813. That is, the blade assembly 813 is formed on the metal ring plate body 41 and the metal ring body 9 by means of plastic injection molding to integrally connect with the metal ring plate body 41 and the metal ring body 9 so as to form the fan impeller 81. The blade assembly 813 has a support section 8131, an extension section 8132, multiple fusion sections 8133 and multiple blades 8134. The blades 8134 are formed on an outer side of the support section 8131. An inner side of the support section 8131 is attached to an outer side of the metal ring body 9 to enclose the metal ring body 9. The extension section 8132 extends from one end of the support section 8131, (that is, the end of the support section 8131 in adjacency to the first side 412) to the multiple perforations 415 of the first side 412 of the metal ring plate body 41 (the metal member). The fusion sections 8133 are formed in the perforations 415 and on the second side 413 of the metal ring plate body 41 in adjacency to the perforations 415. The extension section 8132 is fused with the fusion sections 8133. Accordingly, by means of the perforations 415 of the metal ring plate body 41, the connection strength between the metal hub and the blade assembly 813 is enhanced.

The frame body 82 has a receiving space 821 for receiving the fan impeller 81. The bearing cup 83 is disposed at the center of the receiving space 821. The stator assembly 84 is fitted on the bearing cup 83. The shaft 22 of the metal hub of the fan impeller 81 is rotatably fitted in the bearing cup 83 with the fan impeller 81 covering the stator assembly 84.

In the case that the connection structure 2 of the present invention is applied to a fan 8 with great torque or small torque, the metal ring body 9 is integrally connected with the metal ring plate body 41 by means of laser welding to form the fourth and fifth welding section 91, 95, whereby the structural strength of the metal hub is enhanced. Moreover, by means of the first and second welding sections 42, 43, the structural strength and connection strength between the metal ring plate body 41 and the shaft 22 are greatly enhanced to avoid detachment of the shaft 22 of the fan impeller 81.

Moreover, the cost is lowered and a better counterbalance of the fan impeller 81 is achieved.

In conclusion, in comparison with the conventional fan, the present invention has the following advantages:

1. By means of the connection structure of the present invention, the connection strength and structural strength between the shaft and the hub are effectively enhanced. The connection structure of the present invention is applicable to a fan with small torque or great torque to avoid detachment of the shaft.
2. A better counterbalance of the fan impeller is achieved.
3. The cost is lowered.
4. The fan impeller is prevented from deforming and the internal use space of the fan impeller is enlarged.

The present invention has been described with the above embodiments thereof and it is understood that many changes and modifications in the above embodiments can be carried out without departing from the scope and the spirit of the invention that is intended to be limited only by the appended claims.

What is claimed is:

1. A connection structure applied to a fan for connecting a metal member with a shaft by means of laser welding, comprising:

a single metal member comprising a metal hub having a top section and a skirt section integrally formed with and axially extending from a periphery of the top section, the top section having an opening, a first side and a second side opposite to the first side, the opening being formed through a center of the metal member, the top section and the skirt section together defining a receiving space, multiple holes being formed through the top section and distally spaced from the opening in communication with the receiving space; and a shaft inserted in the opening, an outer circumference of the shaft being welded with a circumference of the opening on the first side to form at least one first welding section between contact sections of the outer circumference of the shaft and the circumference of the opening on the first side, the first welding section being connected between the outer circumference of the shaft and the circumference of the opening on the first side to integrally connect the metal member with the shaft;

wherein the outer circumference of the shaft is welded with the circumference of the opening on the first side by means of laser welding to form the first welding section, the first welding section being annularly arranged along the outer circumference of the shaft in adjacency to the first side, the outer circumference of the shaft being welded with a circumference of the opening on the second side of the metal member by means of laser welding to form at least one second welding section between contact sections of the outer circumference of the shaft and the circumference of the opening on the second side, the second welding section being annularly arranged along the outer circumference of the shaft in adjacency to the second side.

2. A connection structure applied to a fan for connecting a metal member with a shaft by means of laser welding, comprising:

a single metal member comprising a metal hub having a top section and a skirt section integrally formed with and axially extending from a periphery of the top section, the top section having an opening, a first side and a second side opposite to the first side, the opening being formed through a center of the metal member, the top section and the skirt section together defining a receiving space, multiple holes being formed through the top section and distally spaced from the opening in communication with the receiving space; and a shaft inserted in the opening, an outer circumference of the shaft being welded with a circumference of the opening on the first side to form at least one first welding section between contact sections of the outer circumference of the shaft and the circumference of the opening on the first side, the first welding section being connected between the outer circumference of the shaft and the circumference of the opening on the first side to integrally connect the metal member with the shaft;

wherein the outer circumference of the shaft is welded with the circumference of the opening on the first side by means of laser welding to form the first welding section, the first welding section being symmetrically arranged or asymmetrically arranged, the outer circumference of the shaft being welded with the circumference of the opening on the second side of the metal member by means of laser welding to form at least one second welding section between contact sections of the outer circumference of the shaft and the circumference of the opening on the second side, the second welding section being symmetrically arranged or asymmetrically arranged.

3. A connection structure applied to a fan for connecting a metal member with a shaft by means of laser welding, comprising:

a single metal member comprising a metal hub having a top section and a skirt section integrally formed with and axially extending from a periphery of the top section, the top section having an opening, a first side and a second side opposite to the first side, the opening being formed through a center of the metal member, the top section and the skirt section together defining a receiving space, multiple holes being formed through the to section and distally spaced from the opening in communication with the receiving space; and a shaft inserted in the opening, an outer circumference of the shaft being welded with a circumference of the opening on the first side to form at least one first welding section between contact sections of the outer circumference of the shaft and the circumference of the opening on the first side, the first welding section being connected between the outer circumference of the shaft and the circumference of the opening on the first side to integrally connect the metal member with the shaft;

wherein the outer circumference of the shaft is welded with the circumference of the opening on the first side by means of laser welding to form the first welding section, the first welding section being annularly arranged along the outer circumference of the shaft in adjacency to the first side, the outer circumference of the shaft being welded with a circumference of the opening on the second side of the metal member by means of laser welding to form at least one second welding section between contact sections of the outer circumference of the shaft and the circumference of the opening on the second side, the second welding section being annularly arranged along the outer circumference of the shaft in adjacency to the second side; and wherein the metal hub is enclosed in a blade assembly made of plastic material, the blade assembly having a support section, an extension section, multiple fusion sections and multiple blades, the blades being formed on an outer side of the support section, an inner side of the support section being attached to the skirt section to enclose the skirt section, the extension section extending from one end of the support section to the multiple holes of the top section, the fusion sections being formed in the holes and on inner side of the top section in adjacency to the holes, the extension section being fused with the fusion sections.

\* \* \* \* \*